US010706703B1

(12) United States Patent
Barr et al.

(10) Patent No.: US 10,706,703 B1
(45) Date of Patent: Jul. 7, 2020

(54) SERVICE ENTRANCE ALARM SYSTEM AND METHODS OF USING THE SAME

(71) Applicant: Security Products, Inc., Coarsegold, CA (US)

(72) Inventors: Robert Barr, Coarsegold, CA (US); Bert Ohlig, Santa Ana, CA (US)

(73) Assignee: Security Products, Inc., Coarsegold, CA (US)

( * ) Notice: Subject to any disclaimer, the term of this patent is extended or adjusted under 35 U.S.C. 154(b) by 0 days.

(21) Appl. No.: 16/235,461

(22) Filed: Dec. 28, 2018

Related U.S. Application Data

(60) Provisional application No. 62/610,940, filed on Dec. 28, 2017.

(51) Int. Cl.
| | | |
|---|---|---|
| *G08B 13/22* | (2006.01) | |
| *G08B 25/10* | (2006.01) | |
| *G08B 13/08* | (2006.01) | |
| *G06K 7/10* | (2006.01) | |
| *G08B 13/196* | (2006.01) | |
| *G07C 9/28* | (2020.01) | |

(52) U.S. Cl.
CPC ......... *G08B 13/22* (2013.01); *G06K 7/10366* (2013.01); *G07C 9/28* (2020.01); *G08B 13/08* (2013.01); *G08B 13/19695* (2013.01); *G08B 25/10* (2013.01)

(58) Field of Classification Search
None
See application file for complete search history.

(56) References Cited

U.S. PATENT DOCUMENTS

| | | | | | |
|---|---|---|---|---|---|
| 4,023,139 A | * | 5/1977 | Samburg | ............... | B66B 5/0006 340/506 |
| 4,920,333 A | * | 4/1990 | Barr | ....................... | G08B 13/08 340/309.16 |
| 5,066,941 A | | 11/1991 | Lau | | |
| 5,434,556 A | * | 7/1995 | Donohoo | ............... | G08B 13/08 340/528 |
| 5,479,151 A | * | 12/1995 | Lavelle | ................. | E05B 65/108 292/251.5 |

(Continued)

OTHER PUBLICATIONS

Author and Publisher: IEI; Title: IEI MiniMax 3 Installation/Programming Manual; Pertinent Pages: Entire Document (Year: 2008).*

(Continued)

*Primary Examiner* — Steven Lim
*Assistant Examiner* — Muhammad Adnan
(74) *Attorney, Agent, or Firm* — William K. Nelson; Jared Christensen

(57) ABSTRACT

The present invention provides an alarm system capable of monitoring and controlling access to a controlled area using a central controller and access keys each having specified permissions. The system is operable to record images or video of the access entrance areas, utilize sensors for detecting tampering with the hardware of the system; sound alarms when the rules of the alarm system are violated; send alerts to management and other authorized personnel when the rules of the alarm system are violated; and log and correlate data regarding the use of the access keys and images/video taken with the dates and times, and the identities of the access key holders to deter any misuse of the alarm system.

41 Claims, 7 Drawing Sheets

(56) References Cited

U.S. PATENT DOCUMENTS

| | | | |
|---|---|---|---|
| 5,939,974 A * | 8/1999 | Heagle | G06Q 10/06 340/286.09 |
| 5,992,094 A * | 11/1999 | Diaz | E05G 5/02 109/6 |
| 6,218,939 B1 * | 4/2001 | Peper | E05B 47/00 340/545.1 |
| 6,720,874 B2 | 4/2004 | Fufidio et al. | |
| 6,919,812 B2 | 7/2005 | Takee et al. | |
| 7,847,675 B1 * | 12/2010 | Thyen | G07C 9/00896 340/5.1 |
| 7,973,659 B2 | 7/2011 | Sharma et al. | |
| 8,635,462 B2 | 1/2014 | Ullmann | |
| 8,639,939 B2 * | 1/2014 | Holtzman | H04L 9/3228 713/173 |
| 8,957,757 B1 * | 2/2015 | Le Burge | G07C 9/00007 340/5.54 |
| 9,003,560 B1 * | 4/2015 | Bean | G06F 21/12 726/34 |
| 9,230,380 B2 * | 1/2016 | Marsden | G07C 9/00563 |
| 9,948,359 B2 | 4/2018 | Horton | |
| 10,147,249 B1 * | 12/2018 | Brady | G07C 9/00571 |
| 10,186,100 B2 * | 1/2019 | Foot | H04W 4/80 |
| 10,402,804 B1 * | 9/2019 | Wittern, III | G06Q 20/206 |
| 2002/0067259 A1 * | 6/2002 | Fufidio | G07C 9/00031 340/541 |
| 2003/0075287 A1 * | 4/2003 | Weik, III | B60R 25/00 160/133 |
| 2004/0094344 A1 * | 5/2004 | Flick | B60H 3/0071 180/167 |
| 2004/0210515 A1 * | 10/2004 | Hughes | E05G 1/06 705/39 |
| 2005/0017869 A1 * | 1/2005 | Fielmann | G08B 3/10 340/686.6 |
| 2008/0247345 A1 * | 10/2008 | Bahar | H04W 76/10 370/310 |
| 2010/0073161 A1 * | 3/2010 | Engel | G08B 27/005 340/540 |
| 2010/0164683 A1 | 7/2010 | Sharma et al. | |
| 2010/0306549 A1 | 12/2010 | Ullmann | |
| 2011/0160901 A1 * | 6/2011 | Abrams, Jr. | G07F 11/44 700/232 |
| 2011/0276609 A1 * | 11/2011 | Denison | G07F 11/002 707/812 |
| 2012/0204490 A1 * | 8/2012 | Lanigan | E05B 47/0046 49/30 |
| 2014/0019768 A1 * | 1/2014 | Pineau | G06F 21/32 713/186 |
| 2015/0084736 A1 | 3/2015 | Horton | |
| 2016/0343187 A1 * | 11/2016 | Trani | G07C 9/00119 |
| 2017/0169638 A1 * | 6/2017 | Belknap | G08B 13/19634 |
| 2019/0073842 A1 * | 3/2019 | Lee | G07C 9/00031 |

OTHER PUBLICATIONS

Author and Publisher: IEI; Title: Secured Series Access Systems Guide to Building a Max 3 System; Pertinent Pages: Entire Document (Year: 2008).*

IEI Linear MINIMAX3SYS MiniMax 3 Single Door Access Control System Kit; Captured from www.thebuilderssupply.com on Jun. 8, 2019 (Year: 2008).*

* cited by examiner

`US 10,706,703 B1`

SERVICE ENTRANCE ALARM SYSTEM AND METHODS OF USING THE SAME

This application claims priority to U.S. Provisional Patent Application Ser. No. 62/610,940, filed Dec. 28, 2017, pending, which is incorporated herein by this reference in its entirety.

FIELD OF THE INVENTION

The present invention relates generally to alarm systems for a business, and more particularly to improved alarm systems for preventing theft of items stored within the premises.

BACKGROUND OF THE INVENTION

Certain types of business suffer from "internal pilferage." That is to say, there is a high incidence of theft, by employees, of the goods or products stored or handled by the business. This is an especially serious problem in businesses where there is a significant amount of traffic through the building entrances and exits and where it is difficult if not impossible to monitor the activities of all employees.

Alarm systems for doors and other access ways in restaurants, warehouses, and the like, generally fall into two categories. The first category includes those alarms designed to protect from unauthorized entry to the premises. Such alarms may be activated by opening the door or window, by breaking a beam of light, by sensing motion, etc.

Alarms of the second category are designed to protect from unauthorized removal of merchandise from the premises. These types of alarms may be similar to those mentioned above. Additionally, this second category includes alarm systems wherein a magnetic or other device is attached to the merchandise and a sensor placed at each exit of the building. When an item is carried past the sensor, an alarm is activated. Authorized removal of the merchandise from the premises is facilitated by deactivation or removal of the magnetic or other device from the merchandise. Only authorized persons are given devices for deactivating or removing the magnetic or other devices from the merchandise. However, in restaurants and other similar businesses, goods or merchandise cannot always be efficiently or economically tagged with magnetic or other sensors, particularly when there is a high turnover of the goods or merchandise.

Current internal pilferage systems provide an alarm system on a service door which allows employees to deactivate the alarm via a key for a short period of time in order to exit through the door or prop the door open to take waste out or accept delivered goods into the premises. If the door is opened without the alarm being temporarily deactivated, or if the door is not closed or the key re-toggled to reset the time period—before the time period expires, an internal alarm sounds, which can only be deactivated by management personnel with a master key. However, current systems still allow for an employee to pilfer goods by anonymously deactivating the alarm system, potentially for several consecutive time periods by continually toggling the deactivation key, while goods are removed from the premises, without alerting management personnel. Improvements over conventional security and alarm systems are needed.

Improved service entrance and security systems are needed to address the shortcomings of conventional systems.

SUMMARY OF THE INVENTION

The present invention provides an alarm and monitoring system capable of monitoring and controlling access to various access doors and portals to various controlled areas, including security doors, service doors, safe doors, clean room doors, and other passages that require controlled access and monitoring. The system may include a central controller programmed to accept special access keys each having specified permissions (access credentials); recording images or video of the service door areas when the service doors are opened; providing sensors for detecting tampering with the hardware of the system (e.g., tampering with breach sensors); sounding alarms when the rules of the alarm system are violated; sending alerts to management and other authorized personnel when the rules of the alarm system are violated; and logging and correlating data regarding the use of the access keys and images/video taken with the dates and times, and the identities of the access key holders and their access credentials to deter any misuse of the alarm system. The alarm system may include the following major components: a controller, a secured and monitored housing for the controller, a user interface for programming the controller and providing information about the system to the user, sensor systems for monitoring service entrances and the controller housing, alarm annunciators and light (LED) indicators, one or more cameras for monitoring the controller housing and service entrance(s), and a wired or wireless communication device for connecting to the internet and communication with mobile devices.

The alarm system of the present invention may be installed at loading docks, in restaurants, retail establishments, etc., where goods enter or exit the premises through doors, gates, and the like. Each door or gate (hereinafter referred to as service entrances) may be provided with one or more sensor(s) capable of detecting when the service entrance (e.g., a deadlatch thereof) is in an open position. When such is the case the alarm will sound, unless deactivated by a uniquely identifiable access key via a key-switch located near the service entrance or on a housing for the controller of the system. When the access key is used at the key-switch prior to opening the door, a timer mechanism is initiated which deactivates the alarm system for a deactivation period of pre-determined duration, the unique key number may be recorded, the time and date may be recorded, at least one camera positioned to view the service entrance area and/or the housing for the system controller may be activated to record video or capture one or more still images (e.g., digital images) of the person or persons exiting or entering the service entrance, and an alert may be sent to a mobile device belonging to management personnel, the alert including some or all of such recorded information.

The alarm system of the present invention allows for a select number of individuals to be authorized to use a service entrance to a business premises, while still monitoring the use of the service entrance and multiple data regarding each use of the service entrance. The alarm system provides the ability to both prevent unauthorized use of service entrances and monitor authorized use of the service entrances in order to track and deter any pilferage or other unauthorized behavior. In the case of unauthorized use of a service entrance, the alarm system activates an alarm annunciator immediately upon the opening of a service entrance without first using an authorized access key at the appropriate key-switch, and a camera associated with the service entrance is also activated to document the use of the service entrance. In the case of an authorized use of service entrance (i.e., an authorized access key is used at the key-switch associated with the service entrance), the alarm may be deactivated for a specified period to allow the service entrance to be used for appropriate purposes. The alarm system may further be capable of: 1) remotely alerting management personnel whenever the alarm is tripped, deactivated, and/or the controller housing is tampered with; 2) recording identifying information, such as a key identification number associated with the access key; and 3) allowing for management personnel to remotely a) monitor the state of the alarm system, b) review relevant data in the case of a breach of the system or controller housing, and c) adjust alarm system settings.

The present alarm system may be largely controlled and operated by a central controller, which may comprise a programmable logic controller, the logic controller being programmable via a user interface, or remote computer or mobile computing device accessible to management personnel, and may be in electronic communication with each of the electronic devices incorporated into the alarm system including, the breach sensor(s) (which monitor door use), the key-switches, the alarm annunciators, a control box sensor, and the wireless communication device for connecting to the internet and other devices. The controller may be operable to receive electronic signals from one or more breach sensors regarding whether a service entrance is in a closed position or an open position; receive identifying information from a key-switch regarding the uniquely identifiable access key used at a key-switch; receive video data from the at least one camera positioned to view a service entrance; receive input data from a user interface regarding commands for changing the state or functionality of the alarm system; receive input data from a wireless communication device regarding commands for changing the state or functionality of the alarm system; and receive an electronic signal from a control housing sensor that monitors the door of the housing and indicates when the housing is accessed, or whether it has been tampered with. All peripheral devices (e.g., key switches, cameras, sensors, etc.) may be connected to the controller by one or more communication buses. A high level block diagram of an exemplary embodiment of the alarm system of the present invention is provided in FIG. 1.

The controller may include a clock that allows the system to provide accurate log records of access to the service entrances and controller, breaches of the service entrances and controllers, and changes to the settings of the alarm system. The clock may also allow the controller to provide accurate time periods for deactivation periods, during which access to the service entrances and controller are authorized. The controller clock allows for the accurate record of all activities in the alarm system and for coordination of the deactivation periods and the alarm function. Thus, the function of the clock is important to the proper function of the system, and to maintain the function of the clock at all times (e.g., during power interruptions to the premises), the clock may include a backup battery.

The controller may also be operable to provide output data to a display screen for a user interface, such as information regarding the time remaining in a deactivation period after the key-switch is activated; activate camera(s) to start recording video of the service entrance or other areas (e.g., the controller housing) after the key-switch is activated, a deactivation period expires, or the door is opened without activating the key-switch; send an electronic signal to the audible alarm to emit an alarm chirp; and send alerts to the mobile computing devices associated with the alarm system (e.g., smart phones for management personnel) regarding various events, such as use of an access key swiped or otherwise used at a key-switch, an event of a service entrance being opened without authorization, expiration of the deactivation period without the service entrance returning to the closed position, opening of or tampering with the controller housing, and power failures or other interruptions of the function of the alarm system. In the event of an alert sent to a mobile computing device, the alert may include multiple data types, including the identification of an access key used in an event and the person associated with the access key, the time and date of each such event, image or video data recorded during the event, which service door(s) or other items were affected by the event, and the operational status of the alarm system after the event (e.g., whether the various system sensors are operable, the battery condition of the system, etc.).

In some embodiments, the alarm system may include one or more user interfaces that may be in electronic communication with the controller and that may allow for both data presentation and programming and settings changes to the system. The user interface may include a digital display, such as an LCD screen or other digital display that may present data to the user regarding the condition of the system and the door(s) it is monitoring and other useful information, including whether any of the doors are open; whether a door has been opened without authorization; whether the housing has been accessed or tampered with; help information for instructing users; contact information for system service, law enforcement, and other relevant contact information; scheduled delivery times during which the door(s) will need to be accessed for a sustained period; and other relevant information. The controller may be protected from unauthorized tampering by a security housing accessible only to authorized personnel, which is discussed in detail below. In some embodiments, the user interface display may be visible through the housing to personnel that are not authorized to access the housing. For example, the access door of the housing may have a glass or otherwise transparent portion (e.g., security glass) that allows anyone to view data shown on the display, such as the time remaining during a deactivation period. In other embodiments, the display may be positioned on the exterior of the controller housing.

In some embodiments, the user interface may include status light indicators that may be color coded and present different status conditions of the alarm system based on the particular pattern of the color-coded lights presented. For example, the interface may include red, blue, and green LED status lights that present different light patterns to indicate different system statuses. The following status codes may be presented, but are non-limiting exemplary codes:

a. If the BLUE light is ON, the system is in SERVICE mode—with no service entrance or controller box access requested or made,
b. If the access key is used, the GREEN light turns on and the deactivation timer is initiated,
c. If the GREEN light turns on, access is granted and the countdown deactivation timer,
d. When deactivation timer times out, turn the GREEN light turns off,
e. If the RED light is on, a service entrance is open,
f. If the RED light is on and the GREEN light is on—use of service entrance is authorized, do nothing,
g. When the service entrance closes, the RED and GREEN lights turn off,
h. If the RED light is on and the GREEN light is off—service entrance is in unauthorized use, and the alarm will sound, i. If the AC Power is off, red light flashes,
j. If the backup battery is low, all lights flash.

The user interface may also allow the user to select or alter programming for the system. The user interface may include a key pad that allows the user to select and alter various functionalities of the system. The key pad and the display may work in conjunction, such that the inputs of the keys of the keypad are identified on the display. In other embodiments, the display may be a touchscreen that allows the user to alter and select settings for the system by touching virtual buttons on the touchscreen. With the user interface, the user can select or change system settings (e.g., a business hours setting or an after-hours setting), change the status of or add identification keys, change the volume of an alarm annunciator, set various tones for an alarm annunciator for use in variable situations (e.g., setting different alarm tones for (1) an exterior door remaining ajar after the expiration of an deactivation period, (2) an unauthorized opening of an exterior door, and (3) loss of power to the system or a low battery), change registration of access keys to employees, and other functionalities.

The system may be programmed with different modalities for different times of day (e.g., business hours and non-business hours) and different dates (e.g., holidays and weekends vs. business days), each having different rules for accessing an entrance and different rules applying to different subsets of access credentials. The preset modalities or setting modes may include business hours or daytime mode, and a night mode, in order to increase security during times when delivery of goods or other normal entrance and egress from the service entrance is not expected to occur. In comparison to the daytime mode, the night mode may include a pared down list of authorized key identifications (e.g., only management personnel and janitorial personnel), a reduced deactivation period (e.g., about 15 seconds to about 30 seconds), an increased alarm duration (e.g., 5 minutes or more), and an altered alarm sound or visual alert. The controller may be operable to automatically switch from daytime mode to night mode at a predetermined time (e.g., 1 hour after closing time) and switch back to daytime mode at another predetermined time (e.g., 1 hour before opening), or the controller modality may be manually set by management personnel, switching from daytime mode to night mode upon locking the premises at the end of the work day, and switching from night mode to daytime mode upon unlocking the premises at the beginning of the work day. Other conditions may be applied during a high security period such as night mode, including constant video monitoring of the access entrances to allow the camera feed to be remotely monitored at any time via mobile computing devices or remote computer, alerts send to mobile computing devices when motion sensor activation (the system may include motion sensors at the access entrances) whereas the motion sensors are deactivated during the first period (e.g., business hours), deadbolt engagement or other locking mechanisms being engaged to prevent breach of the access entrance, and other enhanced security measures.

The controller may include a memory capable of storing programming for the multiple preset modalities, as well as a list of authorized key identification numbers that may each be assigned to an individual access key, and the controller may be operable to process the identifying information assigned to an access key when it is used (e.g., to deactivate an alarm on a service door monitored by the alarm system, to access the controller housing, etc.). In some examples, the controller may receive the identifying information for an access key from the key-switch when the access key is used to activate the key-switch. The uniquely identifiable access key may include an RFID device (e.g., key card or key fob), a conventional key and/or a key code, a biometric identification (e.g., finger print scan, an eye scan, facial recognition, etc.), voice identification, or other similar unique number, code, or pattern which may be stored in the alarm system and assigned to an individual employee. For example, the access key may include an RFID device that is associated with a particular key identification number and data regarding the user of such access key, and when the access key is swiped at the key-switch (e.g., an RFID scanner), the key-switch transmits a signal to the controller indicating that the access key was swiped and the identification information for the particular access key. The controller may then determine whether such identification information is associated with an authorized key identification number stored in the controller memory. If the controller finds that the access key is authorized, it will execute a pre-programmed action associated with the access, such as deactivating a door alarm for a pre-determined period, deactivating a locking mechanism on the controller housing, and/or other actions.

In some examples, there may be separate classes of access keys, each providing for deactivation periods of different durations, e.g., a first class or group associated with low-level employees that allows for a short deactivation period, and a second class or group for management employees that allows for a longer deactivation period or shutdown of the alarm until it is reactivated). In some embodiments, the deactivation period associated with a particular access key may be extended by using the access key a second time at the key-switch prior to the expiration of the deactivation period (e.g., to allow for deliveries which take longer than one individual deactivation period). The number of allowed consecutive deactivation periods may be limited based on the pre-programmed permissions associated with the particular access key.

The alarm system may include one or more key-switches, each of which may be in electronic communication with the controller. In some embodiments, the alarm system includes a single key-switch mounted on the controller housing. In other embodiments, the alarm system may include one or more key-switches, each positioned near a service entrance (e.g., a key-switch may be positioned adjacent to each service entrance). In embodiments in which the access key is an RFID card or fob, each key-switch may include an RFID reader (e.g., a near field reader antenna) able to recognize an RFID card placed next to the key-switch. The RFID card or fob may include an RFID tag embedded therein that is operable to exchange electromagnetic signals with the antenna of the RFID reader. The RFID tag within each access key may have a unique electronic ID code, coding that identifies the RFID reader with which it authorized/enabled to be used, and other data (e.g., in a 96-bit string). In other embodiments, the key-switch may be a magnetic card reader, a fingerprint scanner, a retina scanner, a voice identification detector with a microphone, a key pad for entering a code, and other similar device for detecting a unique code, signature, pattern, and the like.

The key-switch may be activated by a user (e.g., an employee) with a uniquely identifiable key, such as by placing an RFID card next to the key-switch, sliding a magnetic card, typing in a code, speaking a word or code, or placing his or her eye in position to be scanned by the key-switch, depending on the particular access key technology. After activation, the key-switch may then send a signal to the controller including the identifying data carried on the access key presented by the user. The controller may then determine whether the access key is authorized to open the service door (or the controller housing), and, if yes, initiate a pre-determined action associated with the particular access key (e.g., the controller may be pre-programmed to initiate a deactivation period for a service door based on both the access key and the key-switch at which it was swiped).

In some embodiments, the key-switch may also include an indicator such as an LED light, an annunciator to provide a beeping sound, and/or other accessories, and the controller may send an electronic signal to one or more of the LED indicator light, the annunciator, and/or other accessories to indicate that the pre-determined action has been initiated (e.g., the controller may activate a green LED at or near the key-switch and/or an annunciator to emit a beep to notify the user that an alarm deactivation period has begun). Additionally, the controller may provide output data to an LCD display of a user interface to provide information regarding the initiation and duration of the pre-determined action (e.g., the LCD display may provide alphanumeric symbols indicating the initiation of an alarm deactivation period and may provide an onscreen countdown timer). The one or more key-switches may be in wired or wireless electronic communication with the controller, and may receive power via a wire to the controller, or via a battery, the battery comprising a commercially available battery for electronic devices.

The alarm system of the present invention may monitor multiple service entrances independently. The alarm system may include a plurality of breach sensors, key-switches, annunciating devices, and cameras positioned to view the plurality of service entrances. In such implementations, each different service entrance may have a separate key-switch used to access the particular service door that is in electronic communication with and controlled by the controller. In such implementations, the controller may have different programming for each service entrance. For example, the controller may be programmed to have a different list of authorized access keys, a different deactivation period length, and a different number of allowed consecutive deactivation periods for each service entrance. In such implementations, the key-switch at each service entrance may include an interface that allows the access key to be used and to provide information to the access key holder, such as whether the access key is authorized to deactivate the alarm, and the time allowed for the deactivation period. The interface may further be operable to provide a countdown of the time remaining in the deactivation period and may include an alarm annunciator operable to provide an audible warning when the deactivation period is close to expiration.

In such embodiments, the controller may be operable to monitor the condition of each service entrance via separate sensor inputs into the controller, based on data provided by breach sensors positioned at each service entrance. Each of multiple service entrances may include one or more breach sensors in electronic communication with the controller and operable to send a signal to the controller when the service entrance is open. The breach sensor may comprise at least one of a pressure switch mounted in the door latch system or mounted on the door frame, a magnetic sensor mounted on a door frame (e.g., a high bias dual pole magnetic sensor), a photo detector mounted on the door frame, and another similar type of sensor able to detect when the position of the service entrance changes from a closed position to an open position.

In some embodiments, the breach sensors for the multiple service entrances may be configured such that they are connected in series along a single wire, with an associated resistor network, with each door condition provides a different voltage multiplier to a set input voltage for the system (e.g., provided by the controller). Each door condition combination provides a different return voltage to the controller, which may monitor changes in the return voltage provided by the resistor network and determine the state of the service entrances based on such changes. For example, in the case of an alarm system that includes two service entrances (e.g., A and B), when both service entrances are closed, the resistor network produces a first return voltage value; when A is closed and B is open, the resistor network produces a second return voltage value; when A is open and B is closed, the resistor network produces a third return voltage value; and when both A and B are open, the resistor network produces a fourth return voltage value. The controller may be pre-programmed to associate each return voltage value with the appropriate service entrance condition and activate an alarm if one of the service entrances is opened without authorization.

In some embodiments, and without limitation, the service entrances may be in electronic communication with the controller through a single cable, connecting the service entrances in series. The analog return voltage allows for a reliable and efficient method of monitoring the service entrances for breach of a service entrance, a short in the wiring of the system or operational failure of a sensor in the system. For example, each sensor in the resistor network may have a primary connection for the wiring that is in a closed condition when the service entrance is closed, and secondary connection made by a resistor through which current flows as a bypass when the primary connection is open due to the open condition of the service entrance. Voltage is dropped due to the passage of the current through the resistor associated with the open service entrance, with each resistor having a different R value, allowing the controller to differentiate between service entrances based on the voltage returned to the controller from the resistor network. In order to prevent an alarm from sounding during an authorized deactivation period when a service entrance is opened and a change in the return voltage from the resistor network results, the controller may be operable to receive a disarming signal after an access key is used at a key switch of a service entrance, check the access key identification information to determine whether the access key is authorized to allow access to the service entrance, initiate an alarm deactivation period for the particular service entrance, log the use of the access key and the deactivation period for the service entrance, initiate a deactivation mode specific to the particular service entrance such that the drop in the return voltage from the resistor network is expected by the controller (e.g., when A is closed and B is open, the resistor network produces a second return voltage value and the controller expects to receive the second return voltage). Any drop in return voltage value in the service entrance circuit may be evaluated by the controller for the specific voltage drop to determine which doors are open. For example, if the bypass resistor of entrance A has a resistance value of $R_1$, and the bypass resistor of entrance B has a resistance value of $R_2$, a return voltage ($V_r$) that is equal to the initial voltage ($V_i$)–$R_1$, the controller can determine that entrance A is open, and the controller may then cross-reference the data provided to the controller for key access to determine whether the use of Entrance A was authorized by the use of an appropriate access key associated with an authorized key identification number. As a further example, if $V_r=V_i-R_1-R_2$, the controller can determine that entrances A and B are open, and the controller may then cross-reference the data provided to the controller for key access to determine whether the use of Entrances A and B was authorized by the use of appropriate access keys associated with authorized key identification numbers. If the voltage data from the service entrance circuit and the key access monitoring data coincide and are consistent, no alarm will sound and the appropriate deactivation period will be applied. If the voltage data from the service entrance circuit and the key access monitoring data are inconsistent, the controller may activate an alarm chirp and notifications of a breach of one or more service entrances.

The resistor network may be on a single wire, and be connected in series in an asynchronous circuit, that is not governed by a clock signal of the controller. As a result, the state of the circuit changes as soon as the return voltage input changes, providing a quick reliable signal in the case of an open service entrance or short in the wiring of the sensor chain. Since the resistor network may be arranged in series, there is no issue of conflicting inputs from multiple signal sources (e.g., no overlapping resistor networks that may create a race condition). The alarm system of the present invention may be expanded to multiple resistor networks (e.g., to accommodate a large number of service entrances) by including multiple resistor networks, each handling a plurality of service entrances and having its own logic gate connecting it to the controller. The asynchronous circuit may provide lower power consumption, and better modularity for establishing an alarm system for handling many service entrances.

In some embodiments, each service entrance may be outfitted with a plurality of breach sensors acting in redundancy, in order to decrease the chance of successful tampering with the breach sensors. For example, the service entrance may be outfitted with (1) a pressure switch mounted in the latch on the door frame, or another location, and (2) a magnetic switch mounted on the door frame (e.g., a high bias dual pole magnetic sensor), each being in independent electronic communication with the controller and able to send an independent signal to the controller when opening of the door is detected. In some embodiments, the magnetic switch may include a Hall effect sensor that may detect magnetic tamper attempts near the locking device. If the Hall effect sensor(s) detect a magnetic tamper event, a signal may be sent by the Hall effect sensor(s) to the controller indicating a tampering event, and the controller may then log the date and time of the event, activate a camera monitoring the service door, and/or activate the annunciator to emit an audible alarm. In other embodiments, the service door may be outfitted with one or more sensor(s) such as (1) a pressure switch mounted in the latch on the door frame, or another location, and (2) an optical, capacitive, or other sensor for detecting when the service door is opened, each being in independent electronic communication with the controller and able to send an independent signal to the controller when opening of the door is detected. The breach sensor(s) may be in wired or wireless electronic communication with the controller, and may receive power via a wire to the controller, or via a battery, the battery comprising a commercially available battery for electronic devices.

In addition to the breach sensor(s), each service entrance may also have separate alarm annunciator(s), camera(s) positioned to view the service entrance, and light (e.g., LED) indicators associated therewith. The breach sensor(s), key-switch, alarm annunciators, light indicators, and camera at each of the service entrances may operate independently of the breach sensors, key-switches, alarm annunciators, light indicators, and cameras at each of the other service entrances, while use of all of the service entrances is monitored centrally by the controller.

As mentioned above, the controller may be positioned in a housing that includes a locking device. The housing may be a rigid box with a door having a locking device, and may be mounted on an interior wall of the premises. The controller may be installed inside the housing to protect it from tampering. The housing may be accessed by authorized personnel. Whether a user is authorized may be determined when the user uses his or her access key. The controller may be operable to determine whether an access key is associated with a key identification number that is authorized to access the controller housing, and, if yes, send a signal to the locking device to deactivate and unlock the housing. The locking device may be an electronically controlled locking device. When the user attempts to use his or her access key with the key-switch (which may be an RFID reader or other electronic key receiver, a biometric scanner for performing fingerprint, retinal, or other biometric scans, a microphone for receiving a voice message from the user attempting access for processing by the controller through a voice identification protocol, or a key lock with a sensor in electronic communication with the controller) the key-switch transmits the access key data to the controller to determine whether it is associated with an authorized key identification stored in the memory of the controller. If it is, the controller may signal the locking device to unlock to allow access into the controller housing.

The locking device may include a tamper-resistant locking switch that avoids the shortcomings of conventional locking mechanisms (e.g., magnetic switches that can be defeated with a parallel magnet). The present locking device may include one or more Hall effect sensors used to indicate when the locking device is tampered with. Specifically, the Hall effect sensor(s) may detect magnetic tamper attempts near the locking device. If the Hall effect sensor(s) detect a magnetic tamper event, a signal may be sent by the Hall effect sensor(s) to the controller indicating a tampering event, and the controller may then log the date and time of the event, activate a camera monitoring the housing of the controller, and/or activate the annunciator to emit an audible alarm.

As mentioned above, the alarm system may include at least one camera to record activity of employees and others around the controller housing and/or the service entrance(s). A camera may be mounted on or near the controller housing such that it is pointed outward from the controller housing to capture images or video of anyone using an access key at the controller housing or attempting to access or tamper with the controller housing. Additionally, cameras may be mounted at or near each service entrance (e.g., on a wall or ceiling) and may record images or video of the area around the service entrance. Each camera may be in wired or wireless electronic communication with the controller, and may receive power via a wired connection to the controller, or a wired connection to the power system of the premises, or via one or more batteries. In some embodiments, the at least one camera may be operable to continuously record video or capture still images at regular pre-determined intervals of the area around the service entrance. In other embodiments, the at least one camera may record video or still images of the area around the service entrance only after receiving an activation signal from the controller. The controller may send such signal upon the use of an access key at a key-switch, the housing door being opened or tampered with, an authorized or unauthorized use of a service entrance, tampering with the service entrance breach sensors, and other possible events. In some embodiments, upon receiving a signal from the controller to begin recording, the at least one camera may capture images or record video for a preset time period (e.g., 30 seconds), the preset time period being a system setting which may be lengthened or shortened via the user interface at the controller, or via the mobile computing device belonging to management personnel. In other embodiments, the one or more cameras may capture images or record video upon receiving an activation signal from the controller and continue to record until the triggering event has concluded. For example, in the case of a deactivation period for a service entrance, the controller may activate a camera associated with the service entrance at the time an access key is used to deactivate the alarm and open the service entrance, and the camera may continue to capture images and record until the service entrance is closed. As a further example, in the case of a person accessing the controller housing, the controller may activate a camera mounted on or near the controller housing at the time an access key is used to access the controller housing, and the camera may continue to capture images and record until the controller housing is closed.

As mentioned above, the alarm system may include one or more alarm annunciators operable to provide audible alarms associated with various conditions of and actions by the alarm system. In some embodiments, the alarm system may include a single alarm annunciator positioned on or near the controller housing. In such embodiments, the alarm annunciator may be operable to produce different tones, chimes, or other sounds, such that different, specific tones and sound patterns may be associated with different events. For example, the annunciator may be programmed to produce a first sound pattern in the case of a door remaining open beyond a deactivation period, and a second louder sound pattern in the case of a door being opened without authorization or deactivation of the alarm system. The alarm annunciator may be adjustable and programmable to accommodate the environment in which it is used. For example, the volume may be adjusted such that it is sufficient to alert supervisors or management personnel without disrupting business operations (e.g., without disturbing patrons of a restaurant business). In other embodiments, the alarm system may include multiple alarm annunciators, including an alarm annunciator positioned at or near each service entrance to alert persons in the vicinity of a service entrance that the service entrance has been opened. The service entrance annunciators may have a plurality of tones and chirp patterns for distinguishing between different kinds of events (e.g., if the service entrance was opened without deactivation of the alarm system, a first, more frantic chirp pattern may be produced, and if the service entrance is opened during a deactivation period, a brief, low volume chirp may be produced). The annunciators of the alarm system may be a speaker, bell, or other sound producing mechanism for providing an alarm sound and may be paired with one or more indicator lights for providing a visual alert.

The annunciators may be in wired or wireless electronic communication with the controller, and may receive power via a wire to the controller, or a wire connected to the power system of the premises, or via a battery, the battery comprising a commercially available battery for electronic devices. The annunciator(s) may be operable to receive a signal from the controller to sound or show an alarm status upon the service entrance being opened without deactivation of the alarm system, or remaining open after an authorized deactivation period. Upon receiving a signal from the controller to sound or show the alarm, the annunciator(s) may continue sounding and showing the alarm for a preset time period (e.g., 30 seconds), the preset time period being a setting which may be lengthened or shortened via the user interface at the controller, or via the mobile computing device belonging to management personnel. The annunciator(s) may also be deactivated prior to the expiration of the preset time period via the user interface or via the mobile computing device belonging to management personnel.

The alarm system may also include one more doorbells positioned near the exterior of each or select service entrances of the premises. The doorbell(s) may be in wired or wireless electronic communication with the controller, and may send a signal to the controller to alert the controller of the presence of someone at the service entrance. The service entrance may then be opened by the use of an access key by an authorized user to initiate a deactivation of the alarm system to allow use of the service entrance. In some embodiments, use of the doorbell may result in the controller sending a notification to one or more mobile computing devices (e.g., a smart phone) or other communications or computing devices belonging to management personnel (e.g., a desktop computer). In some embodiments, the alarm system may also include cameras and/or audio transmitters placed at the exterior of the service entrances to allow for visual and/or audible identification of the persons requesting entry through the service entrance. The cameras and/or audio transmitters may be in electronic communication with the controller allowing the controller to display or emit the data provided from the cameras and/or audio transmitter to the display of the user interface and/or to one or more mobile computing devices (e.g., a smart phone) or other communications or computing devices belonging to management or other authorized personnel (e.g., a desktop computer).

In some embodiments, the controller may be connected to the internet via a modem on the premises. The controller may be in wired communication with the modem via an ethernet cable, or the like, or the controller may comprise a wireless connection to the modem. The wireless connection may comprise at least one of a WiFi connection, Bluetooth connection, or other similar wireless connection.

In other embodiments, the alarm system may comprise a wireless communication device operable to independently connect to the internet or a cellular communication platform. The wireless communication device may comprise a commercially available internet connection or cellular connection device. The wireless communication device may be in electronic communication with the controller and be operable to transmit output data via cellular network, over the internet, or through other electronic communication channels to one or more mobile computing devices and/or desktop computers having a software application thereon operable to receive output data from the controller.

In some embodiments, the alarm system of the present invention be operable to transfer and store data on one or more off-sight computers for retaining data collected regarding use of the service entrances, such as access key use data and correlated date, time, and video data.

Authorized users may access the output data through the software application after an authentication procedure has been performed (e.g., user can enter an assigned username and password recognized by the controller). The output data may include information regarding at least one of the key identification, time and date, and image data associated with any authorized access of a service door; the time and date, and image data associated with any unauthorized use of the service door; the key identification, time and date, and image data associated with any access to the controller housing; the time and date, and image data associated with any alteration of the settings of the controller and the particular and altered setting, and the time and date, and image data associated with any tampering with the housing door.

The alarm system may have a power source via an electrical connection to the controller, and may comprise a connection to the power system of the premises. The connection to the power system of the premises may be wired connection (e.g., provided through a port in the wall protected from access to an electric power junction). The power source may also include a battery backup, the battery backup comprising a commercially available backup battery for electronic systems located within the housing.

In operation, if the rules pre-programmed into the controller are violated (e.g., by exceeding the permissions for each access key, tampering with sensors, leaving a service entrance open beyond the deactivation period, etc.), the controller will activate an annunciator to sound an alarm. In such instances, the alarm system will record the alarm event, including the date and time, the particular door that was opened, images and video of the service door or other relevant area, and this data may be correlated with an access key (e.g., if an access key was used in the event). Additionally, the occurrence of an alarm event may be communicated to management personnel through an alert that may be sent to a mobile computing device (e.g., a smart phone) or other communications or computing device belonging to management personnel (e.g., a desktop computer). Such alerts may include some or all of the information recorded by the alarm system —the date and time of the alarm event, the particular door that was opened, the duration that the door was open, image data captured by the at least one camera, the identifiable key that was used to deactivate the alarm, the person to whom the identifiable key was issued, the date and time the identifiable key was used, and other relevant data. In cases where service doors are opened without authorization, an alert may be sent to management or other designated individuals that includes some or all of the information recorded by the alarm system—the date and time of the alarm event, the particular door that was opened, the duration that the door was open, image data captured by the at least one camera, and other relevant data.

The present invention provides improved, more intelligent and efficient service entrance alarm systems that are operable to more finely define authorized access to the service entrances, identify the individuals accessing the service entrances, control the manner of access to the service entrances, provide management or other higher personnel notifications of use and access to the service entrances, allow management and other higher personnel to appropriately customize or modify system settings, enable remote programming and notifications of breaches of the service entrances, and to restrict access to the settings of the alarm system to only authorized personnel while providing a convenient and efficient access to programming tools to the authorized personnel. These and other features and objects of the invention will be apparent from the description provided herein.

In one aspect, the invention relates to an alarm system for an access entrance, the alarm system comprising a programmable controller; an electronic key-switch in electronic communication with the controller; and at least one electronic access device operable to electronically activate the key-switch to send data to the controller and the controller retrieves an electronic record associated with the at least one electronic access device stored in a memory of the controller, the electronic record defining access credentials for the at least one electronic access device, wherein the access credentials define whether the electronic access device is authorized to open the access entrance and the controller deactivates an alarm at the access entrance if the electronic access device is authorized to open the access entrance. Upon an unauthorized use of the access entrance, the controller is operable initiate an alarm. The alarm system may include a lockable housing for the controller; and a breach sensor in electronic communication with the controller for monitoring the access entrance. The alarm system may include a user interface in electronic communication with the controller for programming the controller and providing a display for presenting information to a user. Activation of the key-switch is operable to cause the controller to initiate a deactivation period at the service entrance. The breach sensor may comprise a plurality of first breach sensors and a plurality of access entrances, each of the first breach sensors being in independent electronic communication with the controller and being operable to detect whether one of the plurality of access entrances is in a closed condition or an open condition. The alarm system may include a plurality of second breach sensors in electronic communication with the controller, wherein the plurality of breach sensors provide data to the controller to determine whether each of the plurality of access entrances are in a closed condition or an open condition separately from the plurality of first breach sensors to provide redundant access entrance breach monitoring. The plurality of second breach sensors may be connected in a single series circuit, and the controller may determine whether each of the first and second access entrances are in a closed condition or an open condition based on changes in an electrical characteristic of the series circuit. The alarm system may further comprise an annunciator in electronic communication with the controller for sounding and showing an alarm when the access entrance is opened without use of an electronic access device having access credentials that authorize access to the access entrance. The alarm system may include a plurality of electronic access devices, and the controller may be operable to store unique access credentials for each of the plurality of electronic access devices, wherein the access credentials vary with respect to at least one of whether the electronic access device is authorized to open the access entrance at a particular time, and the duration of time the access entrance is authorized to remain open after use of the access device. The controller may be operable to initiate a deactivation period of an alarm after one of the plurality of electronic access devices is used at the key switch if access credentials associated with the one of the plurality of electronic access devices authorizes the one of the access entrance to be opened. The controller may be operable to initiate a successive deactivation period upon the use of the one of the plurality of electronic access devices at the key-switch prior to the expiration of the deactivation period. The electronic access device may include an RFID device and the key switch comprises an RFID reader. The controller may be operable to be programmed with a plurality of preset modalities. The system may comprise a plurality of electronic access devices each having unique access credentials, and each modality of the plurality of preset modalities are associated with and activated by at least one of the plurality of electronic access devices based on the unique access credentials. Each modality of the plurality of preset modalities may be programmed with at least one of a unique alarm period, a unique deactivation period, a unique annunciator volume, and a unique annunciator sound. Each modality of the plurality of preset modalities may be programmed to authorize a different number of successive deactivation periods. The controller may be in electronic communication with a wired or wireless communication device operable to connect the controller to the internet and communicate with at least one computing device. Upon an unauthorized use of the access entrance the controller may be operable to perform at least one of activating the annunciator to sound, activating a visual alarm device, activating a camera to begin recording video or still images of an area the access entrance, recording the time and date of the unauthorized, identifying and recording the access credentials of the electronic access device if the electronic access device was used at the key switch, and causing an alert to be sent to the at least one computing device. The alarm system may further comprising a secure housing having a housing door with a locking device and at least one sensor for monitoring determining whether the housing door is an open or closed condition. The housing may comprise a plurality of sensors positioned on the perimeter of the housing door, each in electronic communication with the controller and operable to send a signal to the controller when the housing door moves from a closed position to an open position. The housing may include a tamper-resistant sensor that is operable to detect magnetic tampering with the controller, the tamper-resistant sensor being in electronic communication with the controller. The alarm system may include a plurality of electronic access devices, and the controller is operable to store unique access credentials for each of the plurality of electronic access devices, wherein at least one of the access credentials is authorized to unlock the locking device upon a user activating a locking switch with an electronic access device associated with the at least one of the access credentials. The housing may include a housing camera positioned to view a user of the housing, and upon the occurrence of tampering with or opening of the housing door, the controller is operable to cause the housing camera to record video or still images. Upon the occurrence of tampering with or opening of the housing door, the controller may be operable to perform at least one of recording the time, date, activating the housing camera to record video or still images; and causing an alert to be sent to a mobile computing device. The preset modalities may include a set of system conditions in effect during a normal access period and a set of system conditions during a high security period. The normal access period may include access authorization to the access entrance for all of the access credentials, and the alarm deactivation periods. The high security period may include at least one of restriction of access authorization to a subset of the access credentials, constant camera surveillance of the access entrance for remote video feed monitoring through at least one computing device in electronic communication with the controller, and alerts of all use of access entrance to the at least one computing device. The normal access period may be during business hours and the high security period may be during non-business hours.

In a second aspect, the present invention relates to an alarm system for controlling access to a defined area, the alarm system comprising a programmable controller; a lockable housing for the controller; a user interface in electronic communication with the controller for programming the controller and providing a display for presenting information to a user; a breach sensor in electronic communication with the controller for monitoring an access entrance into the defined area; a key-switch in electronic communication with the controller for deactivating the alarm at the access entrance; an annunciator in electronic communication with the controller for sounding and showing an alarm; a camera in electronic communication with the controller for monitoring at least one of the housing and the access entrance; and a communication device in electronic communication with the controller. The controller may be operable initiate an alarm upon an unauthorized use of the access entrance. Activation of the key-switch may cause the controller to initiate a deactivation period at the access entrance. The breach sensor may comprise a plurality of sensors, the plurality of sensors comprising at least one of a pressure switch mounted in a door latch system or on a door frame of the access entrance, a magnetic sensor mounted on the door frame, a photo detector mounted on the door frame, and another similar type of sensor able to detect when the position of the access entrance changes from a closed position to an open position. Each sensor of the plurality of sensors may be in independent electronic communication with the controller. Each sensor of the plurality of sensors may be in wireless electronic communication with the controller. The key-switch may be in wireless electronic communication with the controller and comprises an interface, the interface being operable to recognize one or more uniquely identifiable access keys. The controller may comprise a memory and is operable to be programmed to recognize a set of authorized uniquely identifiable access keys, the controller being operable to initiate the deactivation period upon a user activating the key-switch with an authorized uniquely identifiable access key. The controller may be operable to initiate a successive deactivation period upon the user reactivating the key-switch prior to the expiration of the deactivation period. The interface may comprise an RFID reader and the uniquely identifiable key comprises an RFID card with a unique identification number. The controller may be operable to be programmed with a plurality of preset modalities. The modality of the plurality of preset modalities may be programmed with a different set of authorized uniquely identifiable keys. Each modality of the plurality of preset modalities may be programmed with different alarm periods, deactivation period, annunciator volumes, and annunciator sounds. Each modality of the plurality of preset modalities may be programmed to authorize a different number of successive deactivation periods. The communication device may comprise a wired or wireless communication device operable to connect the controller to the internet or communicate with a mobile computing device. An unauthorized use of the access entrance may cause the controller to perform at least one of: causing the annunciator to sound and show an alarm; causing the camera to begin recording video or still images; recording the time, date, uniquely identifiable key information provided by the user, and video or still images captured by the camera; and causing an alert to be sent to the mobile computing device. The housing may comprise a housing door with a locking device and a sensor for monitoring the position of the housing door. The sensor for monitoring the position of the housing door may comprise a plurality of sensors positioned on the perimeter of the housing door, each in electronic communication with the controller and operable to send a signal to the controller when the housing door moves from a closed position to an open position. The housing may include a tamper-resistant sensor that is operable to detect magnetic tampering with a breach sensor mounted on a door of the housing, the tamper-resistant sensor being in electronic communication with the controller. The controller may comprise a memory and may be operable to be programmed to recognize a set of authorized uniquely identifiable access keys, the controller being operable to unlock the locking device upon a user activating the locking switch with an authorized uniquely identifiable key. The housing may comprise a housing camera positioned to view a user of the housing, and upon the occurrence of tampering with or opening of the housing door, the controller may be operable to cause the housing camera to record video or still images. Upon the occurrence of tampering with or opening of the housing door, the controller may be operable to perform at least one of: recording the time, date, uniquely identifiable key information provided by the user, and video or still images captured by the housing camera; and causing an alert to be sent to a mobile computing device.

In a third aspect, the present invention relates to an alarm system for a premises with a plurality of service entrances, the alarm system comprising a controller for controlling and programming the alarm system; a housing with a lockable housing door for protecting the controller; a plurality of key-switches mounted near the plurality of entrances; a plurality of breach sensors for monitoring the positions of the plurality of service entrances; a plurality of housing door sensors for monitoring the position of the housing door; a plurality of annunciators mounted near the plurality of service entrances to alert persons in the vicinity of unauthorized use plurality of service entrances; a plurality of cameras positioned to monitor the areas around the plurality of service entrances and the housing; and a communication device for connecting to the internet and communication with a mobile device. Each of the plurality of key-switches, an annunciator of the plurality of annunciators, and a camera of the plurality of cameras may be mounted near each service entrance of the plurality of service entrances, and at least two breach sensors of the plurality of breach sensors are positioned on or near the door of each service entrance. Each key-switch of the plurality of key-switches may be in independent electronic communication with the controller, and when one of the key-switches is activated, the controller is operable to determine at which of the service entrances the activated key-switch is located. Each annunciator of the plurality of annunciators and each camera of the plurality of cameras may be in independent electronic communication with the controller. The unauthorized use of one of the plurality of service entrances may cause the controller to activate the annunciator located at the service entrance to sound and show an alarm, and cause the camera located at the service entrance to begin recording video or still images. The plurality of breach sensors may be configured in a access entrance resistor network, and each service entrance condition provides a different voltage multiplier to a set input voltage provided by the controller, and each service entrance condition combination provides a different return voltage to the controller, the controller being operable to monitor changes in the return voltage and determine the condition of each service entrance of the plurality of service entrances based on the changes. The unauthorized use of one of the plurality of service entrances triggers the controller to send an alert to a mobile computing device in electronic communication with the controller. The annunciator at a first service entrance may sound an alarm with a different alarm duration, volume, or sound than the annunciator at a second service entrance. The controller may be operable to sound an alarm at a first service entrance and a second service entrance simultaneously, or at the first service entrance only, or at the second service entrance only. The controller may be to receive a command from a mobile computing device in electronic communication with the controller.

In a fourth aspect, the present invention relates to a method of implementing an alarm system for an access entrance, the alarm system comprising providing programmable controller in electronic communication with a keyswitch associated with the access entrance; programming the controller to recognize at least one electronic access device to electronically activate the key-switch, wherein the electronic access device provides data to the controller via the key switch, and storing an electronic record associated with the at least one electronic access device in a memory of the controller, the electronic record defining access credentials for the at least one electronic access device, wherein the access credentials define whether the electronic access device is authorized to open the access entrance and the controller deactivates an alarm at the access entrance if the electronic access device is authorized to open the access entrance. Upon an unauthorized use of the access entrance, the controller is operable initiate an alarm. The alarm system may include a lockable housing for the controller; and a breach sensor in electronic communication with the controller for monitoring the access entrance. The alarm system may include a user interface in electronic communication with the controller for programming the controller and providing a display for presenting information to a user. Activation of the key-switch is operable to cause the controller to initiate a deactivation period at the service entrance. The breach sensor may comprise a plurality of first breach sensors and a plurality of access entrances, each of the first breach sensors being in independent electronic communication with the controller and being operable to detect whether one of the plurality of access entrances is in a closed condition or an open condition. The alarm system may include a plurality of second breach sensors in electronic communication with the controller, wherein the plurality of breach sensors provide data to the controller to determine whether each of the plurality of access entrances are in a closed condition or an open condition separately from the plurality of first breach sensors to provide redundant access entrance breach monitoring. The plurality of second breach sensors may be connected in a single series circuit, and the controller may determine whether each of the first and second access entrances are in a closed condition or an open condition based on changes in an electrical characteristic of the series circuit. The alarm system may further comprise an annunciator in electronic communication with the controller for sounding and showing an alarm when the access entrance is opened without use of an electronic access device having access credentials that authorize access to the access entrance. The alarm system may include a plurality of electronic access devices, and the controller may be operable to store unique access credentials for each of the plurality of electronic access devices, wherein the access credentials vary with respect to at least one of whether the electronic access device is authorized to open the access entrance at a particular time, and the duration of time the access entrance is authorized to remain open after use of the access device. The controller may be operable to initiate a deactivation period of an alarm after one of the plurality of electronic access devices is used at the key switch if access credentials associated with the one of the plurality of electronic access devices authorizes the one of the access entrance to be opened. The controller may be operable to initiate a successive deactivation period upon the use of the one of the plurality of electronic access devices at the key-switch prior to the expiration of the deactivation period. The electronic access device may include an RFID device and the key switch comprises an RFID reader. The controller may be operable to be programmed with a plurality of preset modalities. The system may comprise a plurality of electronic access devices each having unique access credentials, and each modality of the plurality of preset modalities are associated with and activated by at least one of the plurality of electronic access devices based on the unique access credentials. Each modality of the plurality of preset modalities may be programmed with at least one of a unique alarm period, a unique deactivation period, a unique annunciator volume, and a unique annunciator sound. Each modality of the plurality of preset modalities may be programmed to authorize a different number of successive deactivation periods. The controller may be in electronic communication with a wired or wireless communication device operable to connect the controller to the internet and communicate with at least one computing device. Upon an unauthorized use of the access entrance the controller may be operable to perform at least one of activating the annunciator to sound, activating a visual alarm device, activating a camera to begin recording video or still images of an area the access entrance, recording the time and date of the unauthorized, identifying and recording the access credentials of the electronic access device if the electronic access device was used at the key switch, and causing an alert to be sent to the at least one computing device. The alarm system may further comprising a secure housing having a housing door with a locking device and at least one sensor for monitoring determining whether the housing door is an open or closed condition. The housing may comprise a plurality of sensors positioned on the perimeter of the housing door, each in electronic communication with the controller and operable to send a signal to the controller when the housing door moves from a closed position to an open position. The housing may include a tamper-resistant sensor that is operable to detect magnetic tampering with the controller, the tamper-resistant sensor being in electronic communication with the controller. The alarm system may include a plurality of electronic access devices, and the controller is operable to store unique access credentials for each of the plurality of electronic access devices, wherein at least one of the access credentials is authorized to unlock the locking device upon a user activating a locking switch with an electronic access device associated with the at least one of the access credentials. The housing may include a housing camera positioned to view a user of the housing, and upon the occurrence of tampering with or opening of the housing door, the controller is operable to cause the housing camera to record video or still images. Upon the occurrence of tampering with or opening of the housing door, the controller may be operable to perform at least one of recording the time, date, activating the housing camera to record video or still images; and causing an alert to be sent to a mobile computing device. The preset modalities may include a set of system conditions in effect during a normal access period and a set of system conditions during a high security period. The normal access period may include access authorization to the access entrance for all of the access credentials, and the alarm deactivation periods. The high security period may include at least one of restriction of access authorization to a subset of the access credentials, constant camera surveillance of the access entrance for remote video feed monitoring through at least one computing device in electronic communication with the controller, and alerts of all use of access entrance to the at least one computing device. The normal access period may be during business hours and the high security period may be during non-business hours.

Further aspects and embodiments will be apparent to those having skill in the art from the description and disclosure provided herein.

It is an object of the present invention to provide an internal pilferage alarm system capable of preventing anonymous deactivation of the alarm system by recording and storing identifying information such as a specific employee number and a video recording of the service door area, every time the alarm is deactivated.

It is a further object of the present invention to provide an internal pilferage alarm system which is capable of preventing theft in real time by alerting management personnel when the alarm system is deactivated or the alarm system settings are manipulated.

It is a further object of the present invention to provide an internal pilferage alarm system which is programmable on site via a user interface, or remotely, e.g. via a mobile computing device belonging to management personnel.

It is a further object of the present invention to provide an internal pilferage alarm system with access to the internet for various purposes such as sending information to, and receiving commands from, a mobile computing device belonging to management personnel, and other purposes.

It is a further object of the present invention to provide an internal pilferage alarm system with memory features able to record and store various business data related to the service entrance.

It is a further object of the present invention to provide an internal pilferage alarm system with multiple modalities, each modality being programmed for different situations or times of day, such as a daytime mode and a night mode, the night mode restricting authorization to deactivate the alarm system to a more exclusive group of employees.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns a service entrance alarm system capable of providing a select number of individuals with control over entry and exit from a service entrance to a business premises, typically a service entrance. The alarm system is activated whenever a door latching element such as a deadlatch, on the service entrance door is opened without first deactivating the alarm. Deactivation of the alarm may be allowed via a uniquely identifiable key (e.g., a key-card) for only a short, preset length of time for one class of employees, while management personnel may be allowed to deactivate the alarm indefinitely. The alarm system may further be capable of: 1) allowing authorized use of service entrances and other portals with the use of authorized access keys; 2) allowing authorized access to a system controller with the use of authorized access keys; 3) emitting alarms in the case of unauthorized access to a service entrance or the system controller, or other use of a service entrance that violates the pre-programmed rules of the alarm system; 4) recording identifying information, such as a key identification number and a video recording of any person tripping the alarm, deactivating the alarm, or changing the settings of the alarm system at the service entrance; 5) remotely alerting management personnel whenever the alarm is tripped or deactivated; and 6) allowing for management personnel to remotely adjust alarm system settings.

Figure 1:
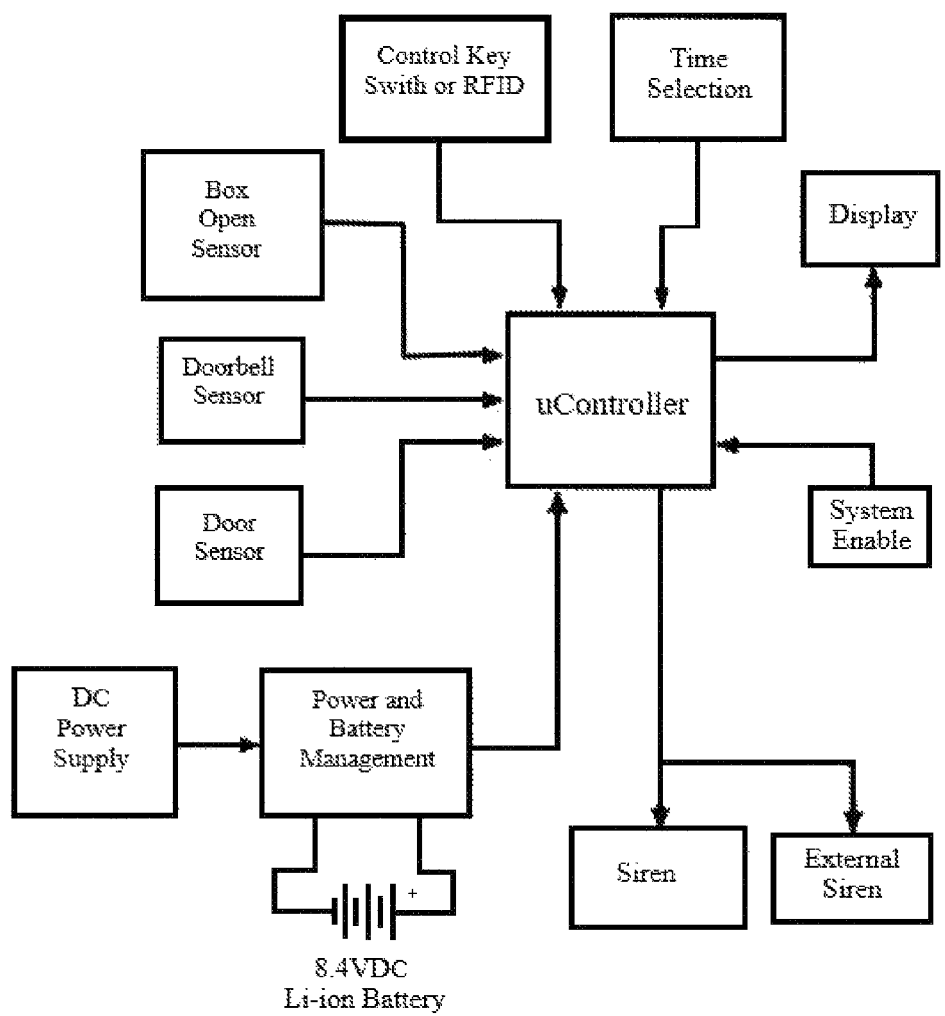
FIG. 1 shows a diagram of a service entrance alarm system, according to an embodiment of the present invention.
Figure 2:
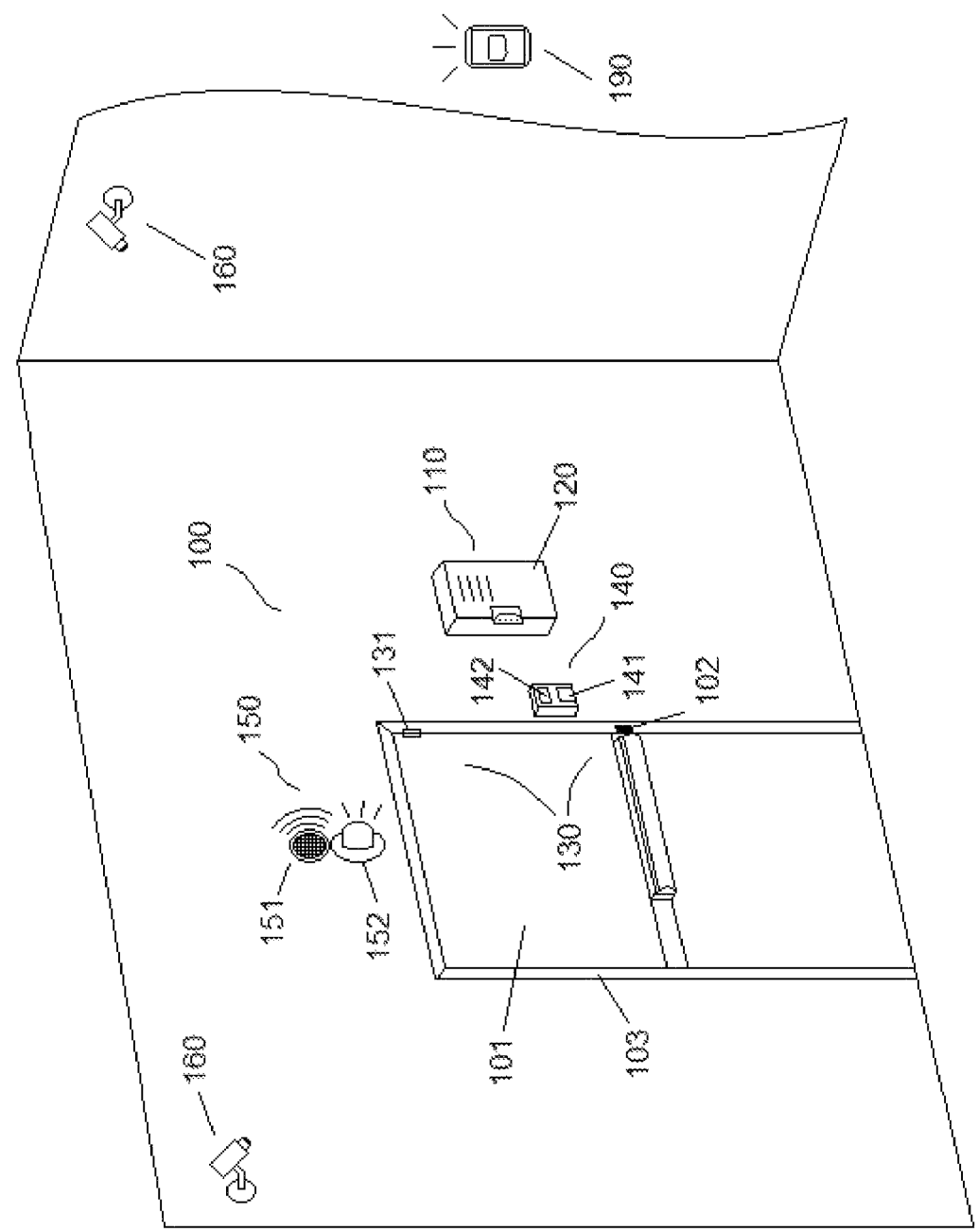
FIG. 2 shows a perspective view of a service entrance alarm system, according to an embodiment of the present invention.
Figure 3:
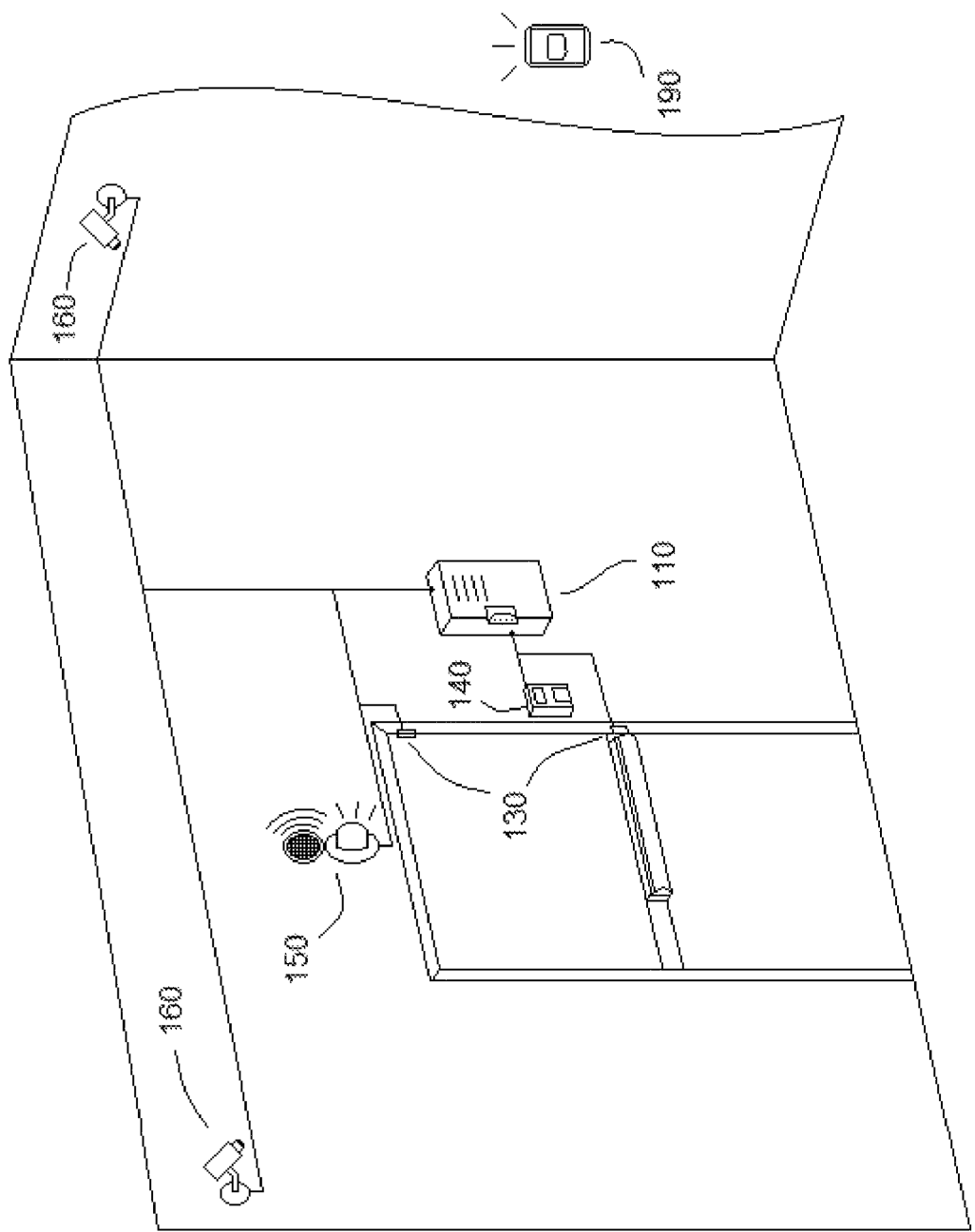
FIG. 3 shows a perspective view of a service entrance alarm system, according to an embodiment of the present invention.
Figure 4:
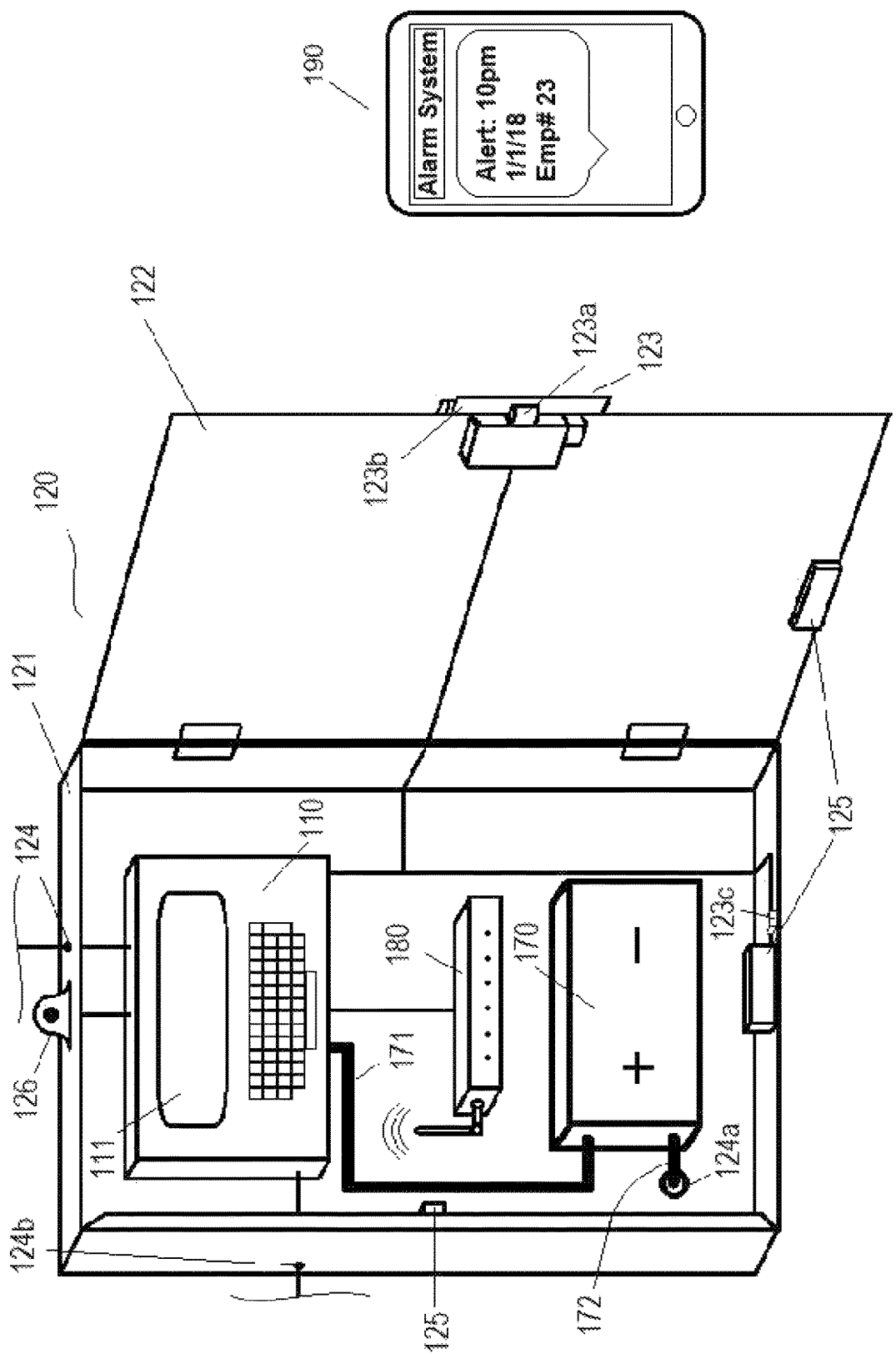
FIG. 4 shows a perspective view of components of a service entrance alarm system, according to an embodiment of the present invention.

FIGS. 2-4 each provide a perspective view of the alarm system 100, according with an embodiment of the present invention. The alarm system 100 may comprise a controller 110 (see FIG. 4 for detailed view), a housing 120 for controlling and preventing access to the controller 110, a door breach sensor 130, a key-switch 140, an annunciating device 150, at least one camera 160 directed at the service entrance 101, and a power source 170. In some embodiments, the alarm system may also include a wireless communication device 180 for connecting to the internet.

FIG. 4 provides a perspective view of the housing 120 with the housing door 122 open, according to an embodiment of the present invention. The housing 120 may contain and limit access to the controller 110, the wireless communication device 180, and the power source 170. The housing 120 may comprise a rigid box 121 with a housing door 122 having a locking device 123 and one or more exit holes 124 for wires to pass through, and may be mounted on an interior wall of the premises, preferably near the service entrance 101. The controller 110 may be installed inside the housing 120, and any wires leading to other components of the alarm system 100 (e.g., the breach sensor 130, key-switch 140, at least one camera 160, and power source 170) may enter the housing 120 through holes 124. Holes 124 are depicted as being present in the sidewalls of the housing 124 and the wires passing therethrough are shown as routed along walls of the premises; however, it is to be understood that in the embodiments of the present invention, the holes 124 and the wires are presented in this manner only for explicatory purposes, and the wires may be routed through the walls and pass through the rear, wall-mounted portion of the controller box to prevent access to the wiring and tampering. For example, the holes 124 may be positioned at the back of the housing facing the wall (see 124a), allowing wires to pass from inside the wall into the housing 120.

The locking device 123 may comprise a key-switch with a deadlatch 123a, the key-switch may be an access key reader 123b activated by a uniquely identifiable access key, and may be operable to send a signal to the controller 110 with the access key identification information. The locking device 123 may further be operable to unlock if the controller 110 sends a signal back indicating that the key identification is included in a list of authorized uniquely identifiable access keys saved in the memory of the controller 110. The camera 126 may be mounted on the housing 120 (e.g., on an upper surface or on the face of the housing), facing outward from the door 122, or on a wall or ceiling near the housing 120.

The housing 120 may further comprise at least one housing door sensor 125 capable of detecting whether the housing door 122 is in a closed position, and sending a signal to the controller 110 when the housing door 122 is not in the closed position. The controller 110 may then send such information to a mobile computing device 190 belonging to management personnel. The controller 110 may further be operable to enter a restricted mode (e.g., wherein alarm system settings cannot be changed) to prevent tampering with the alarm system settings when the locking device 123 indicates that the housing door 122 is still locked and/or that no authorized person has accessed the housing door 122. In some embodiments, the alarm system may include at least one housing door sensor 125 that indicates whether the housing door 122 is open. The housing door sensor may be a magnetic sensor. However, the housing door sensor may be of another breach sensor type, as discussed herein. In some embodiments, an anti-tampering sensor 123c (e.g., a Hall effect sensor) may be positioned near the at least one housing door sensor 125 to detect housing door tampering. The anti-tampering sensor(s) may detect magnetic tamper attempts near the at least one housing door sensor 125. If the anti-tampering sensor(s) detect a magnetic tamper event, a signal may be sent by the anti-tampering sensor(s) to the controller 110 indicating a tampering event, and the controller 110 may then log the date and time of the event, activate the camera 126 monitoring the housing 120 of the controller 110, activate the annunciator to emit an audible alarm, and/or activate a restricted mode (e.g., wherein alarm system settings cannot be changed) to prevent tampering with the alarm system settings. In some embodiments, the at least one housing door sensor 125 may comprise a plurality of housing door sensors positioned at different locations along a perimeter of the housing door 122.

The anti-tampering sensors of the present invention may have several characteristics that enable them to effectively detect magnetic tampering events that may be used to disable or manipulate the security system. The anti-tampering sensors may have high sensitivity to magnetic fields to detect strong magnets at a distance (e.g., before they are deployed immediately adjacent to the controller housing 120 and to compensate for distortion of the an applied magnetic field caused by structures and components in the housing 120 that may cause distortion areas or gaps in the sensor's detection area if the sensitivity is not high enough. The anti-tampering sensors may also have high dynamic range in contrast to some magnetic sensing technologies that have a narrow range of lower and upper bounds on magnetic fields. The anti-tampering sensors of the present security systems may have sensitivity in a range of about ±130 mV/mT, or any range of values therein (e.g., ±100 mV/mT, ±80 mV/mT, ±70 mV/mT, etc.). Because magnetic tampering with the controller 110 may occur with magnets applied in various orientations, the anti-tampering sensors of the present security systems may detect magnetic fields regardless of the magnet's orientation. This may require multi-axial or omni-directional sensitivity. Conventional sensors are only sensitive to fields in a single direction or plane. The anti-tampering sensors of the present security systems may be have omnidirectional sensitivity to account for application of an external magnet in any orientation to any exposed point on the housing 121 (front face, top, bottom, or sides). For example, and without limitation, the anti-tampering sensor(s) may be vertical Hall-effect sensors or a compound sensor having planar Hall-effect sensors oriented in x, y, and z axes.

The breach sensors 130 at the service entrance 101 may be in electronic communication with the controller 110 and be operable to detect when the service entrance 101 is opened and send a signal to the controller 110 regarding the same. The breach sensors 130 may comprise both a pressure switch mounted in the door latch 102, and a magnetic sensor 131 mounted on the door frame 103, the pressure switch being operable to detect when a deadlatch of the service entrance 101 is not present inside the door latch 102, and the magnetic sensor 131 being able to detect when the position of the service entrance 101 changes from the closed position to an open position. The breach sensors 130 may act in redundancy, in order to decrease the chance of successful tampering with the breach sensors 130. For example, each of the pressure switch and the magnetic sensor 131 being in independent electronic communication with the controller 110 and able to send an independent signal to the controller 110 when opening of the service entrance is detected.

The breach sensors 130 may comprise a commercially available pressure and magnetic sensors, or other sensor types as discussed herein. The breach sensors 130 may be in wired (see FIG. 3) or wireless (see FIG. 2) electronic communication with the controller 110, and may receive power via a wire leading to the controller 110, or via a battery.

The key-switch 140 may be in electronic communication with the controller 110 and mounted on a wall or door frame 103 next to the service entrance 101. The key-switch 140 may comprise an interface 141. The interface 141 may comprise an RFID reader (e.g., a near field reader antenna) able to recognize an access key that includes a RFID tag placed next to the interface 141. In other embodiments, the interface 141 may comprise a magnetic card reader, a fingerprint scanner, a retina scanner, a voice detector with a microphone, a key pad for entering a code, and other similar device for detecting a unique code, signature, pattern, and the like. The key-switch 140 may be activated by a user (e.g., an employee) with a uniquely identifiable access key (e.g., that includes an RFID tag) by placing the access key in proximity to the interface 141. The key-switch 140 may be operable to then send a signal to the controller 110 including the identifying information provided on the RFID tag of the access key. The key-switch 140 may then receive a return signal from the controller 110 with information as to whether the access key is authorized to access the service entrance, and display such information to the user via an indicator 142. The indicator 142 may comprise an LCD display with alphanumeric symbols, and a beeping sound. The key-switch 140 may be in wired (see FIG. 3) or wireless (see FIG. 2) electronic communication with the controller 110, and may receive power via a wire leading to the controller 110, or via a battery, the battery comprising a commercially available battery for electronic devices.

The annunciating device 150 may be operable to alert persons in the vicinity of the service entrance 101 that the service entrance 101 is open in an unauthorized manner, such as being opened without deactivation of the alarm system 100, or remaining open after an authorized deactivation period has expired. An alarm initiated by an open service entrance 101 may be terminated by activation of the key-switch 140 at the service entrance by a key authorized to terminate a service entrance 101 alarm (e.g., a key-card assigned to management personnel).

The annunciating device 150 may be mounted on a wall or ceiling near the service entrance 101, and may comprise at least one of a speaker 151 for providing an alarm sound and an indicator light 152 for providing a visual alert. The annunciating device 150 may be in wired (see FIG. 3) or wireless (see FIG. 2) electronic communication with the controller 110, and may receive power via a wired connection to the controller 110, or a wired connection to the power system of the premises, or a battery. The annunciating device 150 may be operable to receive a signal from the controller 110 to sound and show an alarm status upon the service entrance 101 being opened without deactivation of the alarm system 100, or remaining open after an authorized deactivation period. Upon receiving a signal from the controller 110 to sound and show the alarm, the annunciating device 150 may continue emitting alarm chirp and flashing light for a preset time period (e.g., 30 seconds), the preset time period being a setting which may be lengthened or shortened via the controller 110, or by authorized personnel (e.g., management personnel) via the mobile computing device 190 or a desktop computer. Similarly, the annunciating device 150 may also be deactivated prior to the expiration of the preset time period.

The at least one camera 160 directed at the service entrance 101 may comprise one or more cameras, each mounted on a wall or ceiling near the service entrance 101 and operable to provide video of the area around the service entrance 101. The at least one camera 160 may be in wired (see FIG. 3) or wireless (see FIG. 2) electronic communication with the controller 110, and may receive power via a wired connection to the controller 110, or a wired connection to the power system of the premises, or via a battery.

The one or more cameras 160 may begin recording video or photographs of the area around the service entrance 101 upon receiving a signal from the controller 110, the controller 110 sending such signal upon the occurrence of at least one of the key-switch 140 being activated, the housing door 122 being opened or tampered with, the service entrance 101 being opened without deactivation of the alarm system 100, or tampering with breach sensors of the service entrance 101. Upon receiving the signal from the controller to being recording, the one or more cameras 160 may continue recording for a preset time period (e.g., 30 seconds), the preset time period being a setting which may be lengthened or shortened by authorized personnel via the controller 110, or via the mobile computing device 190 or desktop computer. In cases in which the one or more cameras 160 are activated due to a service entrance door remaining open past the deactivation period, the one or more cameras 160 may continue recording until the controller 110 detects that the service entrance has been closed.

The power source 170 may provide power to the alarm system via an electronic connection 171 (see FIG. 4) to the controller 110, and may comprise a connection 172 to the power system of the premises. The connection 172 to the power system of the premises may comprise a connection to an electric power junction within a wall of the premises or at a circuit breaker. The power source may also include a battery backup, the battery backup comprising a commercially available backup battery for electronic systems located within the housing.

The controller 110 may comprise a programmable logic controller, the logic controller being programmable by authorized personnel via a user interface 111 or via a mobile computing device 190 or desktop computer in electronic communication with the controller 110. The controller 110 may be in electronic communication with each of the housing sensors 123c and 125, the breach sensor(s) 130, the locking device 123, the key-switches 140, the annunciating device 150, the one or more cameras 126 and 160, the power source 170, the wireless communication device 180, and mobile-computing devices 190 and/or desktop computers operated by authorized personnel (e.g., management personnel). The controller may be capable of receiving information from the housing sensor 125 regarding whether the housing door 122 is closed, analyzing whether an access key used to activate locking device 123 on the housing door 122 is authorized to access the housing 120; receiving visual data in the form of video or one or more still images (e.g. digital images) from camera 126 positioned to view a person attempting to open the housing door 122 or access the system components within the housing 120; receiving information from the breach sensor(s) 130 regarding whether the service entrance 101 is in a closed position or an opened position; receiving identifying information from the key-switch 140 regarding the access key used to activate the key-switch 140; receiving video data from the one or more cameras 160 positioned to view the service entrance 101; receiving information from the wireless communication device 180 regarding commands received from the mobile computing device 190 belonging to management personnel; and other functionalities as described herein.

The controller 110 may also be operable to send information to the user interface 111 regarding the time remaining in a deactivation period after the key-switch 140 is activated; send information to the one or more cameras 160 to start recording video of the service entrance 101 after the key-switch 140 is activated, a deactivation period expires, or the service entrance 101 is opened without activating the key-switch 140; send information to the annunciating device 150 to sound the alarm; and send information to a mobile computing device 190 or a desktop computer in electronic communication with the controller 110 regarding identification data of the access key used to activate the key-switch 140, unauthorized access of a service entrance 101 without activation of the key-switch 140, expiration of the deactivation period without the service entrance 101 returning to the closed position, video data from the at least one camera 180, information regarding the housing door 122 being unlocked or tampered with, and information regarding the status of the settings of the alarm system 100.

The controller 110 may further comprise a memory device capable of storing a list of authorized identification numbers associated with particular access keys, and may further be operable to process the identifying information received from the key-switch 140 regarding the identification of an access key used to activate the key-switch 140, determining whether such identification is included in the list of authorized key identification numbers, and, if yes, initiating a deactivation period. Similarly, the controller 110 may be operable to process the identifying information received from the locking device 123 of the housing 120 regarding the identification of an access key used to activate the locking device 123, determining whether such identification is included in a list of authorized key identification numbers for unlocking the housing 120, and, if yes, sending a signal back to the locking device 123 to unlock the housing door 122. The user interface 111 may be operable to display information regarding whether the access key used to activate the key-switch 140 at the service door 101, or the locking device 123 of the housing 120, is authorized or unauthorized. The controller 110 may be operable to record and store data regarding identifying information for each uniquely identifiable key used to activate the key-switch 140 or the locking device 123, whether such uniquely identifiable key was authorized, and the time and date of such activation, as well as corresponding video data from the at least one camera 160, for later retrieval.

The controller 110 may be operable to initiate an unlocked period upon an authorized unlocking of the housing door 122. The unlocked period may be a predetermined amount of time (e.g., two minutes) in which the controller 110, the power source 170, or the wireless communication device 180 may be accessed by a user for maintenance or programming. The controller 110 may be operable to provide a signal, such as a beeping noise, when the unlocked period is about to expire, allowing the user to either close the housing door 122, or re-activate the locking device 123. Upon the housing door 122 being open after the expiration of an unlocked period, the controller 110 may produce an alarm by activating the annunciator and/or light emitter 150. The alarm may be terminated by swiping an access key authorized to terminate a controller housing alarm (e.g., a keycard assigned to management personnel) at the access key reader 123b locking device 123, or by entering a deactivation code into the user interface 111 of the controller 110 or by authorized user via mobile computing device 190 or desktop computer in electronic communication with the controller 110.

The controller 110 may be connected to the internet via a modem on the premises, the controller 110 being in communication with the modem via the wireless communication device 180, or the wireless communication device 180 may directly connect the controller 110 to the internet. The wireless communication device 180 may be operable to communicate with connection may comprise at least one of a WiFi connection, Bluetooth connection, cellular connection, or other similar wireless connection. The wireless communication device 180 may be in electronic communication with the controller 110 and be operable to transmit data which is routed to the mobile computing device 190 or a desktop computer accessible to management or other authorized personnel. Such data may include information regarding at least one of the key identification, time, and date of any key-switch 140 or locking device 123 activation and any expiration of an authorized deactivation period or unlocked period, the time and date of any unauthorized opening of the service door 101, any altered setting of the controller 110, and the time, date, and video of any tampering with the housing door 122. The wireless communication device 180 may comprise a commercially available internet connection or cellular connection device.

Figure 5:
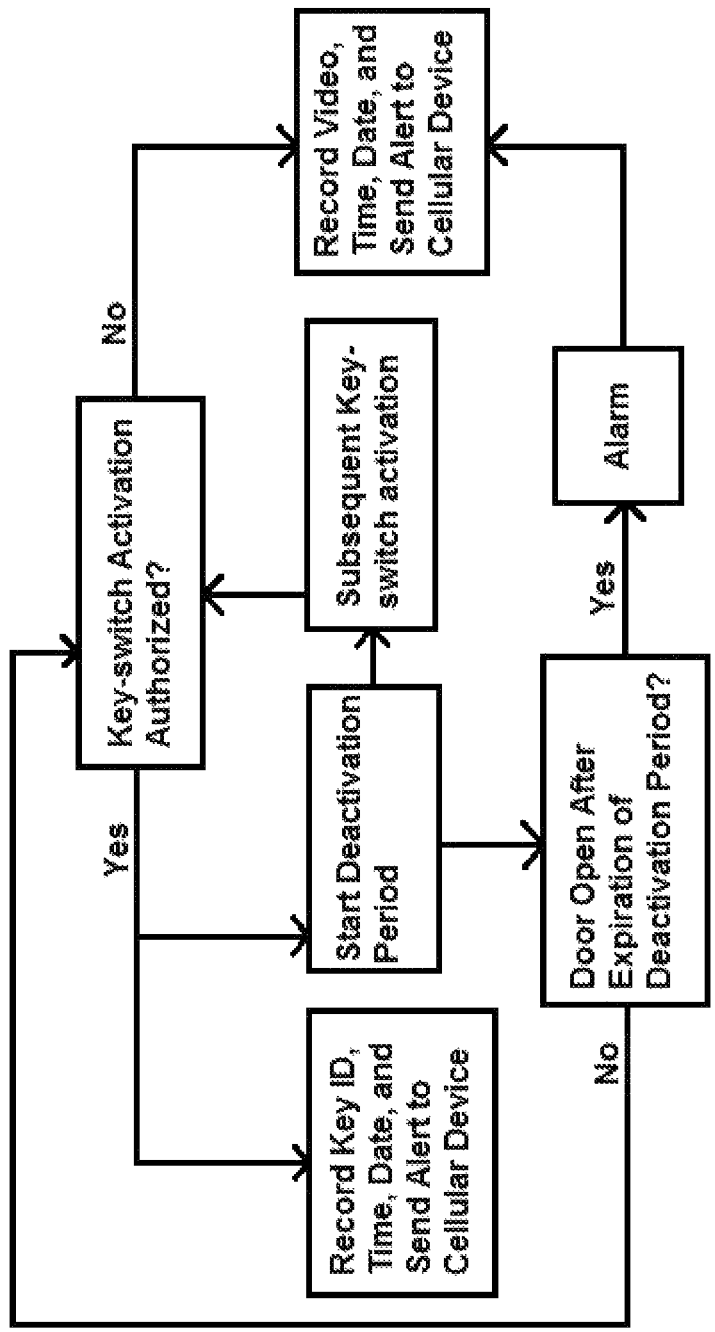
FIG. 5 shows a flow chart illustrating logic program steps of a service entrance alarm system, according to an embodiment of the present invention.

FIG. 5 provides a flow chart illustrating an exemplary logic program of the controller 110 in relation to deactivating the alarm at the service entrance 101, opening of the service entrance 101, and monitoring the service entrance 101, according to an embodiment of the present invention. The logic program of the controller shown in FIG. 5 is a non-limited example and may be arranged differently in other embodiments of the present invention.

Figure 6:
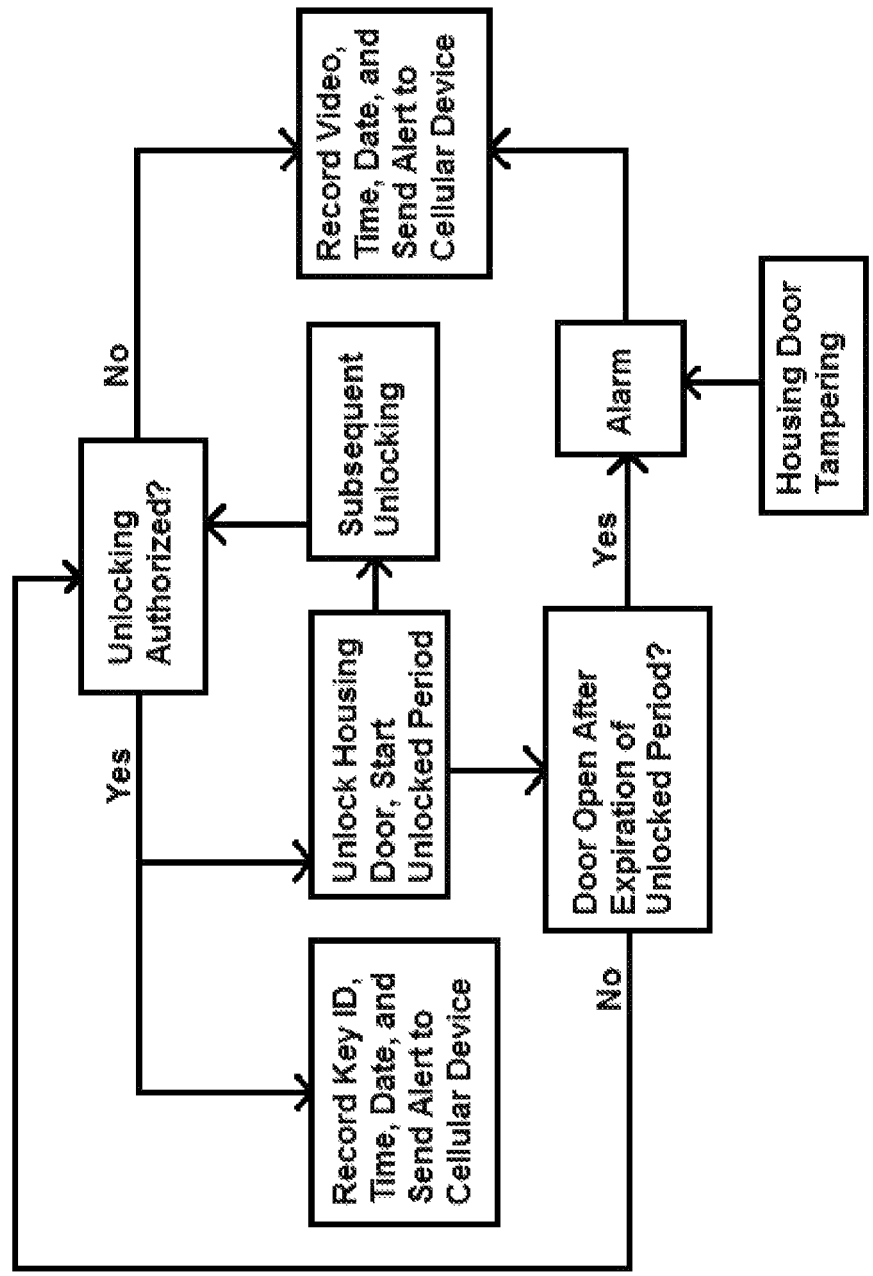
FIG. 6 shows a flow chart illustrating logic program steps of a service entrance alarm system, according to an embodiment of the present invention.

FIG. 6 provides a flow chart illustrating an exemplary logic program of the controller 110 in relation to unlocking the locking device 123, opening of or tampering with the housing door 122, and monitoring the housing 120, according to an embodiment of the present invention. The logic program of the controller shown in FIG. 6 is a non-limited example and may be arranged differently in other embodiments of the present invention.

Figure 7:
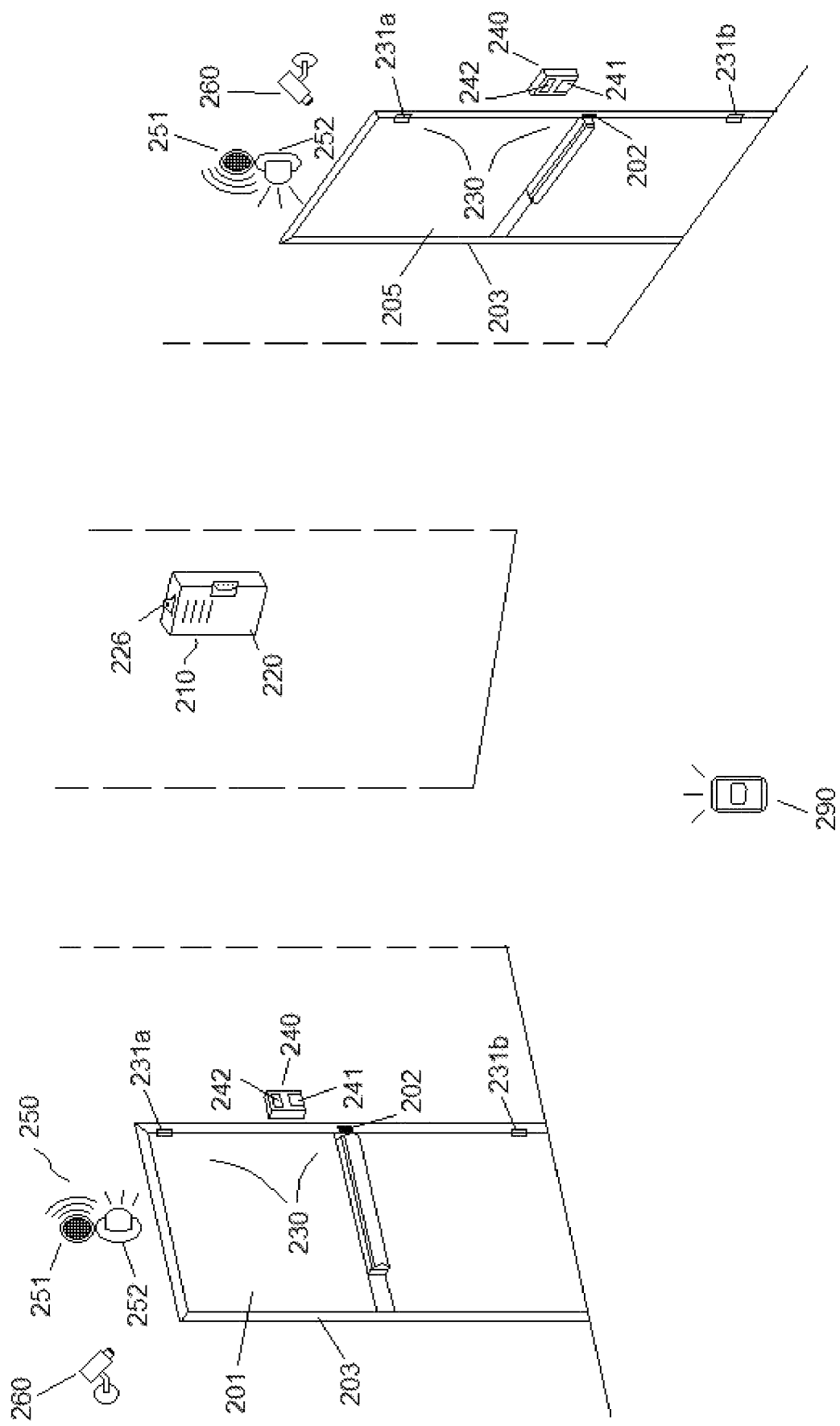
FIG. 7 shows a perspective view of a service entrance alarm system, according to an embodiment of the present invention.

FIG. 7 provides a perspective view of an alarm system 200, according to another embodiment of the present invention. The alarm system 200 may comprise a controller 210 which provides security for a premises with a plurality of service entrances 201, 205. The alarm system may further comprise a housing 220 for preventing access to the controller 210, a plurality of breach sensors 230, a plurality of key-switches 240, a plurality of annunciating devices 250, a plurality of cameras 260, a power source (see FIG. 4), and a wireless communication device (see FIG. 4). The broken vertical lines are intended to show that the various sections of the system (e.g., each service entrance, and the controller housing) may be located in different rooms at distance from one another.

The alarm system 200 may be installed in a premises with a plurality of service entrances 201, 205, and may comprise a single controller 210, the controller 210 being operable to monitor all service entrances 201, 205 of the premises. Each service entrance of the plurality of service entrances 201, 205 may have its own breach sensors 230, key-switch 240, annunciating device 250, and camera 260 positioned to view the area around the service entrance. The controller 210, the power source, and the wireless communication device may each be located within a housing 220, the housing 220 being substantially similar to the embodiment shown in FIG. 4, with a camera 226 positioned to view a person attempting to open the housing door 222 or access the system components within the housing 220. The camera 226 may be mounted on the housing 220 (e.g., on an upper surface of the housing), or on a wall or ceiling near the housing 220. The housing may be located near a service entrance, or may be located in a different advantageous location on the premises (e.g., near a management office).

A plurality of breach sensors 230 may be installed at each service entrance of the plurality of services entrances 201, 205. The plurality of breach sensors 230 installed at a first service entrance 201 may be in electronic communication with the controller 210 and be operable to detect when the service entrance 201 is not in a closed position and send a signal to the controller 210 regarding the same. Likewise, the plurality of breach sensors 230 installed at a second service entrance 205 may be in electronic communication with the controller 210 and be operable to detect when the second service entrance 205 is not in a closed position and send a signal to the controller 210 regarding the same. The plurality of breach sensors 230 installed at the first service entrance 201 and the second service entrance 205 may each comprise at least one of a pressure switch mounted in the door latch 202, and a plurality of sensors 231a, 231b (e.g., high bias dual pole magnetic sensors, photo detectors, or other similar position sensors) mounted at different locations on the door frame 203, the pressure switch being operable to detect when a deadlatch of the service entrance 201, 205 is not in an extended position inside the door latch 202, and the plurality of sensors 231a, 231b being able to detect when the position of the service entrance 201, 205 changes from the closed position to an open position.

The plurality of sensors 231a, 231b may comprise a plurality of magnetic sensors, the plurality of magnetic sensors arranged in at least one of: an independent, redundant electronic communication arrangement with the controller 210, or configured in a resistor network, wherein each service entrance condition provides a different voltage multiplier to a set input voltage for the system (e.g., provided by the controller 210). Each service entrance condition combination provides a different return voltage to the controller 210, which may monitor changes in the return voltage provided by the entrance circuit and resistor network and determine the state of the service entrances 201, 205 based on such changes. For example, when the both the first service entrance 201 and the second service entrance 205 are closed, the entrance circuit and resistor network produces a first return voltage value (e.g., which may be virtually the same as the voltage sent through the network with only negligible loss); when the first service entrance 201 is closed and the second service entrance 205 is open, the resistor network produces a second return voltage value (e.g., where the voltage initially sent through the network is reduced by the resistance value of a resistor bypass associated with the second service entrance 205); when the first service entrance 201 is open and the second service entrance 205 is closed, the resistor network produces a third return voltage value (e.g., where the voltage initially sent through the network is reduced by the resistance value of a resistor bypass associated with the first service entrance 201); and when both the first service entrance 201 and the second service entrance 205 are open, the resistor network produces a fourth return voltage value (e.g., where the voltage initially sent through the network is reduced by both the resistance values of a resistor bypass associated with the first service entrance 201 and a resistor bypass associated with the second service entrance 205). The controller 210 may be pre-programmed to associate each return voltage value with the appropriate service entrance condition and activate the annunciator device 250 and camera 260 at the first service entrance 201 if the first service entrance 201 is opened without authorization, activate the annunciator device 250 and camera 260 at the second service entrance 205 if the second service entrance 205 is opened without authorization, or activate both annunciator devices 250 and both cameras 260 if both the first service entrance 201 and the second service entrance 205 are both opened without permission. The service entrances may be in electronic communication with the controller 210 through a single cable, connecting the service entrances in series in the entrance circuit and resistor network. Thus, the analog return voltage allows for a reliable and efficient method of monitoring the service entrances for breach of a service entrance, a short in the wiring of the system or operational failure of a sensor in the system.

The plurality of breach sensors 230 may each be in wired communication with the controller 210 (e.g., through the resistor network), and each may receive power via the wired connection, or via a battery. In some embodiments, or wireless electronic breach sensors 230 may each be in wireless communication with the controller 210, and each may receive power via a wired connection to a power source of the premises, or via a battery.

At least one key-switch 240 of the plurality of key-switches may be mounted near each of the first service entrance 201 and the second service entrance 205 (e.g., on a wall or door frame 203). Each key-switch 240 may be in independent, wired or wireless electronic communication with the controller 210. When a key-switch 240 is activated, the controller 210 may be operable to determine at which service entrance 201, 205 the activated key-switch 240 is located. For example, one key-switch 240 may be located at and electronically associated with the first service entrance 201, and a different key-switch 240 may be located at and electronically associated with the second service entrance 205.

Each key-switch 240 may comprise an interface 241 and an indicator 242, the indicator comprising an LCD display with alphanumeric symbols, and a beeping sound. The interface 241 may comprise an RFID reader (e.g., a near field reader antenna) able to recognize an access key that includes an RFID tag placed in proximity to the interface 241. Each key-switch 240 may be independently activated by a user (e.g., an employee) with a uniquely identifiable access key such as the RFID card by passing the access key across a reading/receiving surface of the interface 241. For example, an employee may activate the key-switch 240 located at the first service entrance 201 by placing the access key assigned to that employee on a key reader (e.g., RFID reader) of the interface 241, the key-switch 240 then sends a signal to the controller 210 comprising the identification information provided on the RFID tag of the access key, and if that employee is currently authorized to use the first service entrance 201, the controller 210 will initiate a deactivation period at the first service entrance 201, as indicated by the indicator 242 at the first service entrance 201. Likewise, an employee may activate the key-switch 240 located at the second service entrance 205, the key-switch 240 at the second service entrance 205 sends a signal to the controller 210 comprising the identification information provided on the RFID tag of the access key, and if that employee is currently authorized to use the second service entrance 205, the controller 210 will initiate a deactivation period at the second service entrance 205, as indicated by the indicator 242 at the second service entrance 205.

In some embodiments, an employee may have a first set of permissions at the first service entrance 201, and a second set of permissions at the second service entrance 205. For example, the employee may be authorized to use the first service 201 entrance but not the second service entrance 205, or vise versa, or may be authorized to initiate multiple successive deactivation periods at the first service entrance, but only a single deactivation period at the second service entrance 205.

At least one annunciating device 250 of the plurality of annunciating devices 250 may be mounted near each of the first service entrance 201 and the second service entrance 205 (e.g., on a wall or ceiling). Each annunciating device 250 may be in independent, wired or wireless electronic communication with the controller 210, the controller being operable to activate the annunciating device 250 at the first service entrance 201 only, or activate the annunciating device 250 at the second service entrance 205 only, or both at the same time. The annunciating device 250 at the first service entrance 201 may be operable to alert persons in the vicinity of the first service entrance 201 that the first service entrance 201 is open in an unauthorized manner, such as being opened without deactivation of the alarm system 200, or remaining open after an authorized deactivation period has expired. Likewise, the annunciating device 250 at the second service entrance 205 may be operable to alert persons in the vicinity of the second service entrance 205 that the second service entrance 205 is open in an unauthorized manner. Each annunciating device 250 may comprise at least one of a siren 251 for providing an alarm sound and an indicator light 252 for providing a visual alert. Each annunciating device 150 may receive power via a wired connection to the controller 210, or a wired connection to the power system of the premises, or via a battery.

Upon receiving a signal from the controller 210 to sound an alarm and activate the indicator light 252, each annunciating device 250 may continue sounding and showing the alarm for a preset time period (e.g., 30 seconds), the preset time period being a setting which may be lengthened or shortened via the controller 210, or by authorized personnel via a mobile computing device 290 belonging or a desktop computer in electronic communication with the controller 210. Each annunciating device 250 may also be independently deactivated, such that the annunciating device 250 at the first service entrance 201 may be deactivated prior to expiration of the alarm, without effecting an alarm being sounded by the annunciating device 250 at the second service entrance 205, or vice versa. In some embodiments, the annunciating device 250 located at the first service entrance 201 may be programmed to sound or show an alarm for a longer or shorter time, and/or at a higher or lower volume, than the annunciating device 250 at the second service entrance 205. In some embodiments, the controller 210 may be programmed to deactivate the annunciating device 250 upon the cessation of the event that initiated the alarm. For example, if the alarm was initiated because a service entrance remained open beyond the deactivation period, the controller 210 may deactivate the annunciator 250 once the service entrance is closed.

At least one camera of the plurality of cameras 260 may be mounted near each of the first service entrance 201 and the second service entrance 205 (e.g., on a wall or ceiling). Each camera 260 may be in independent, wired or wireless electronic communication with the controller 210, the controller 210 being operable to activate the camera 260 at the first service entrance 201 independently, or activate the camera 260 at the second service entrance 205 independently, or both at the same time. Each camera 260 may receive power via a wired connection to the controller 210, or a wired connection to the power system of the premises, or via a battery.

The camera 260 located at the first service entrance 201 may begin recording video or still images (e.g. digital images) of the area around the first service entrance 201 upon receiving a signal from the controller 210, the controller 210 sending such signal upon the occurrence of a key-switch 240 at the first service entrance 201 being activated, or the first service entrance 201 being opened in an unauthorized manner. Likewise, the camera 260 located at the second service entrance 205 may begin recording video or still images of the area around the second service entrance 205 upon receiving a signal from the controller 210, the controller 210 sending such signal upon the occurrence of a key-switch 240 at the second service entrance 205 being activated, or the second service entrance 205 being opened in an unauthorized manner. Upon receiving a signal from the controller 210 to begin recording, each camera 260 may continue recording for a preset time period (e.g., 30 seconds), the preset time period being a setting which may be lengthened or shortened via the controller 210, or by authorized personnel via a mobile computing device 290 belonging or a desktop computer in electronic communication with the controller 210. In some embodiments, the camera 260 at the first service entrance 201 may be programmed to record for a longer or shorter preset time period than the camera 260 at the second service entrance 205. In some embodiments, the controller 210 may be programmed to deactivate the camera 260 upon the cessation of the event that initiated recording. For example, if the alarm was initiated because a service entrance remained open beyond the deactivation period, the controller 210 may deactivate the camera 260 once the service entrance is closed.

The present alarm system and methods are capable of monitoring and controlling access to various access doors and portals to various controlled areas, including security doors, service doors, safe doors, clean room doors, and other passages that require controlled access and monitoring. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An alarm system for an access entrance, the alarm system comprising:
   a. a programmable controller;
   b. an electronic key-switch in electronic communication with the controller;
   c. at least one electronic access device operable to electronically activate said key-switch to send data to said controller and said controller retrieves an electronic record associated with said at least one electronic access device stored in a memory of said controller, said electronic record defining access credentials for said at least one electronic access device, wherein said access credentials define whether said electronic access device is authorized to open said access entrance and said controller deactivates an alarm at the access entrance if said electronic access device is authorized to open said access entrance; and
   d. a secure housing for the programmable controller and at least one sensor for monitoring and determining whether the housing door is an open or closed condition having a housing door with a locking device, wherein the housing includes a tamper-resistant sensor that is operable to detect magnetic tampering with the controller, the tamper-resistant sensor being in electronic communication with the controller.

2. The alarm system of claim 1, further comprising:
   a.a breach sensor in electronic communication with the controller for monitoring the access entrance.

3. The alarm system of claim 1, further comprising a user interface in electronic communication with the controller for programming the controller and providing a display for presenting information to a user.

4. The alarm system of claim 1, wherein activation of the key-switch is operable to cause the controller to initiate a deactivation period at the service entrance.

5. The alarm system of claim 2, wherein the breach sensor comprises a plurality of first breach sensors and a plurality of access entrances, each of said first breach sensors being in independent electronic communication with said controller and being operable to detect whether one of said plurality of access entrances is in a closed condition or an open condition.

6. The alarm system of claim 5, further comprising a plurality of second breach sensors in electronic communication with said controller, wherein said plurality of breach sensors provide data to said controller to determine whether each of the plurality of access entrances are in a closed condition or an open condition separately from said plurality of first breach sensors to provide redundant access entrance breach monitoring.

7. The alarm system of claim 6, wherein the plurality of second breach sensors are connected in a single series circuit, and said controller determines whether each of the first and second access entrances are in a closed condition or an open condition based on changes in an electrical characteristic of the series circuit.

8. The alarm system of claim 1, further comprising an annunciator in electronic communication with the controller for sounding and showing an alarm when the access entrance is opened without use of an electronic access device having access credentials that authorize access to said access entrance.

9. The alarm system of claim 1, wherein said system includes a plurality of electronic access devices, and said controller is operable to store unique access credentials for each of said plurality of electronic access devices, wherein said access credentials vary with respect to at least one of the determination of whether the electronic access device is authorized to open said access entrance at a particular time, and the duration of time the access entrance is authorized to remain open after use of the access device.

10. The alarm system of claim 6, wherein the controller is operable to initiate a deactivation period of an alarm after one of said plurality of electronic access devices is used at said key switch if access credentials associated with said one of said plurality of electronic access devices authorizes said one of said access entrance to be opened.

11. The alarm system of claim 10, wherein the controller is operable to initiate a successive deactivation period upon the use of said one of said plurality of electronic access devices at the key-switch prior to the expiration of the deactivation period.

12. The alarm system of claim 1, wherein said at least one electronic access device includes and RFID device and the key switch comprises an RFID reader.

13. The alarm system of claim 1, wherein the controller is operable to be programmed with a plurality of preset modalities.

14. The alarm system of claim 13, wherein said system comprises a plurality of electronic access devices each having unique access credentials, and each modality of the plurality of preset modalities are associated with and activated by at least one of said plurality of electronic access devices based on said unique access credentials.

15. The alarm system of claim 14, wherein each modality of the plurality of preset modalities are programmed with at least one of a unique alarm period, a unique deactivation period, a unique annunciator volume, and a unique annunciator sound.

16. The alarm system of claim 1, wherein upon an unauthorized use of the access entrance the controller is operable to perform at least one of activating the annunciator to sound, activating a visual alarm device, activating a camera to begin recording video or still images of an area the access entrance, recording the time and date of the unauthorized, identifying and recording the access credentials of the electronic access device if the electronic access device was used at the key switch, and causing an alert to be sent to the at least one computing device.

17. The alarm system of claim 1, wherein said system includes a plurality of electronic access devices, and said controller is operable to store unique access credentials for each of said plurality of electronic access devices, wherein at least one of said access credentials is authorized to unlock the locking device upon a user activating a locking switch with an electronic access device associated with said at least one of said access credentials.

18. The alarm system of claim 17, wherein, upon the occurrence of tampering with or opening of the housing door, the controller is operable to perform at least one of recording the time, date, activating said housing camera to record video or still images; and causing an alert to be sent to a mobile computing device.

19. The alarm system of claim 13, wherein said preset modalities include a set of system conditions in effect during a normal access period and a set of system conditions during a high security period.

20. The alarm system of claim 19, wherein said normal access period includes access authorization to said access entrance for all of said access credentials, and said alarm deactivation periods.

21. The alarm system of claim 19, wherein said high security period includes at least one of restriction of access authorization to a subset of said access credentials, constant camera surveillance of said access entrance for remote video feed monitoring through at least one computing device in electronic communication with said controller, and alerts of all use of access entrance to said at least one computing device.

22. An alarm system for an access entrance, the alarm system comprising:
  a. a programmable controller;
  b. an electronic key-switch in electronic communication with the controller;
  c. at least one electronic access device operable to electronically activate said key-switch to send data to said controller and said controller retrieves an electronic record associated with said at least one electronic access device stored in a memory of said controller, said electronic record defining access credentials for said at least one electronic access device, wherein said access credentials define whether said electronic access device is authorized to open said access entrance and said controller deactivates an alarm at the access entrance if said electronic access device is authorized to open said access entrance; and
  d. a secure housing having a housing door with a locking device, wherein said alarm system includes a plurality of electronic access devices, and said controller is operable to store unique access credentials for each of said plurality of electronic access devices, wherein at least one of said access credentials is authorized to unlock the locking device upon a user activating a locking switch with an electronic access device associated with said at least one of said access credentials.

23. The alarm system of claim 22, further comprising:
  a. at least one sensor for determining whether the housing door is an open or closed condition; and
  b. a breach sensor in electronic communication with the controller for monitoring the access entrance.

24. The alarm system of claim 22, further comprising a user interface in electronic communication with the controller for programming the controller and providing a display for presenting information to a user.

25. The alarm system of claim 22, wherein activation of the key-switch is operable to cause the controller to initiate a deactivation period at the service entrance.

26. The alarm system of claim 23, wherein the breach sensor comprises a plurality of first breach sensors and a plurality of access entrances, each of said first breach sensors being in independent electronic communication with said controller and being operable to detect whether one of said plurality of access entrances is in a closed condition or an open condition.

27. The alarm system of claim 26, further comprising a plurality of second breach sensors in electronic communication with said controller, wherein said plurality of breach sensors provide data to said controller to determine whether each of the plurality of access entrances are in a closed condition or an open condition separately from said plurality of first breach sensors to provide redundant access entrance breach monitoring.

28. The alarm system of claim 27, wherein the plurality of second breach sensors are connected in a single series circuit, and said controller determines whether each of the first and second access entrances are in a closed condition or an open condition based on changes in an electrical characteristic of the series circuit.

29. The alarm system of claim 22, wherein said system includes a plurality of electronic access devices, and said controller is operable to store unique access credentials for each of said plurality of electronic access devices, wherein said access credentials vary with respect to at least one of the determination of whether the electronic access device is authorized to open said access entrance at a particular time, and the duration of time the access entrance is authorized to remain open after use of the access device.

30. The alarm system of claim 29, wherein the controller is operable to initiate a deactivation period of an alarm after one of said plurality of electronic access devices is used at said key switch if access credentials associated with said one of said plurality of electronic access devices authorizes said one of said access entrance to be opened.

31. The alarm system of claim 30, wherein the controller is operable to initiate a successive deactivation period upon the use of said one of said plurality of electronic access devices at the key-switch prior to the expiration of the deactivation period.

32. The alarm system of claim 22, wherein said at least one electronic access device includes and RFID device and the key switch comprises an RFID reader.

33. The alarm system of claim 22, wherein the controller is operable to be programmed with a plurality of preset modalities.

34. The alarm system of claim 33, wherein said system comprises a plurality of electronic access devices each having unique access credentials, and each modality of the plurality of preset modalities are associated with and activated by at least one of said plurality of electronic access devices based on said unique access credentials.

35. The alarm system of claim 34, wherein each modality of the plurality of preset modalities are programmed with at least one of a unique alarm period, a unique deactivation period, a unique annunciator volume, and a unique annunciator sound.

36. The alarm system of claim 22, wherein upon an unauthorized use of the access entrance the controller is operable to perform at least one of activating the annunciator to sound, activating a visual alarm device, activating a camera to begin recording video or still images of an area the access entrance, recording the time and date of the unauthorized, identifying and recording the access credentials of the electronic access device if the electronic access device was used at the key switch, and causing an alert to be sent to the at least one computing device.

37. The alarm system of claim 22, wherein the housing includes a tamper-resistant sensor that is operable to detect magnetic tampering with the controller, the tamper-resistant sensor being in electronic communication with the controller.

38. The alarm system of claim 37, wherein upon the occurrence of tampering with or opening of the housing door, the controller is operable to perform at least one of recording the time, date, activating said housing camera to record video or still images, and causing an alert to be sent to a mobile computing device.

39. The alarm system of claim 33, wherein said preset modalities include a set of system conditions in effect during a normal access period and a set of system conditions during a high security period.

40. The alarm system of claim 39, wherein said normal access period includes access authorization to said access entrance for all of said access credentials, and said alarm deactivation periods.

41. The alarm system of claim 39, wherein said high security period includes at least one of restriction of access authorization to a subset of said access credentials, constant camera surveillance of said access entrance for remote video feed monitoring through at least one computing device in electronic communication with said controller, and alerts of all use of access entrance to said at least one computing device.

* * * * *